Jan. 26, 1937.  R. F. MALLINA  2,069,041
METHOD OF AND APPARATUS FOR MANIPULATING ARTICLES,
SUCH AS TALKING MACHINE OR PHONOGRAPH RECORDS
Filed Feb. 16, 1929  16 Sheets-Sheet 1

INVENTOR
Rudolph F. Mallina,
BY Lyman D. Oberlin
his ATTORNEY

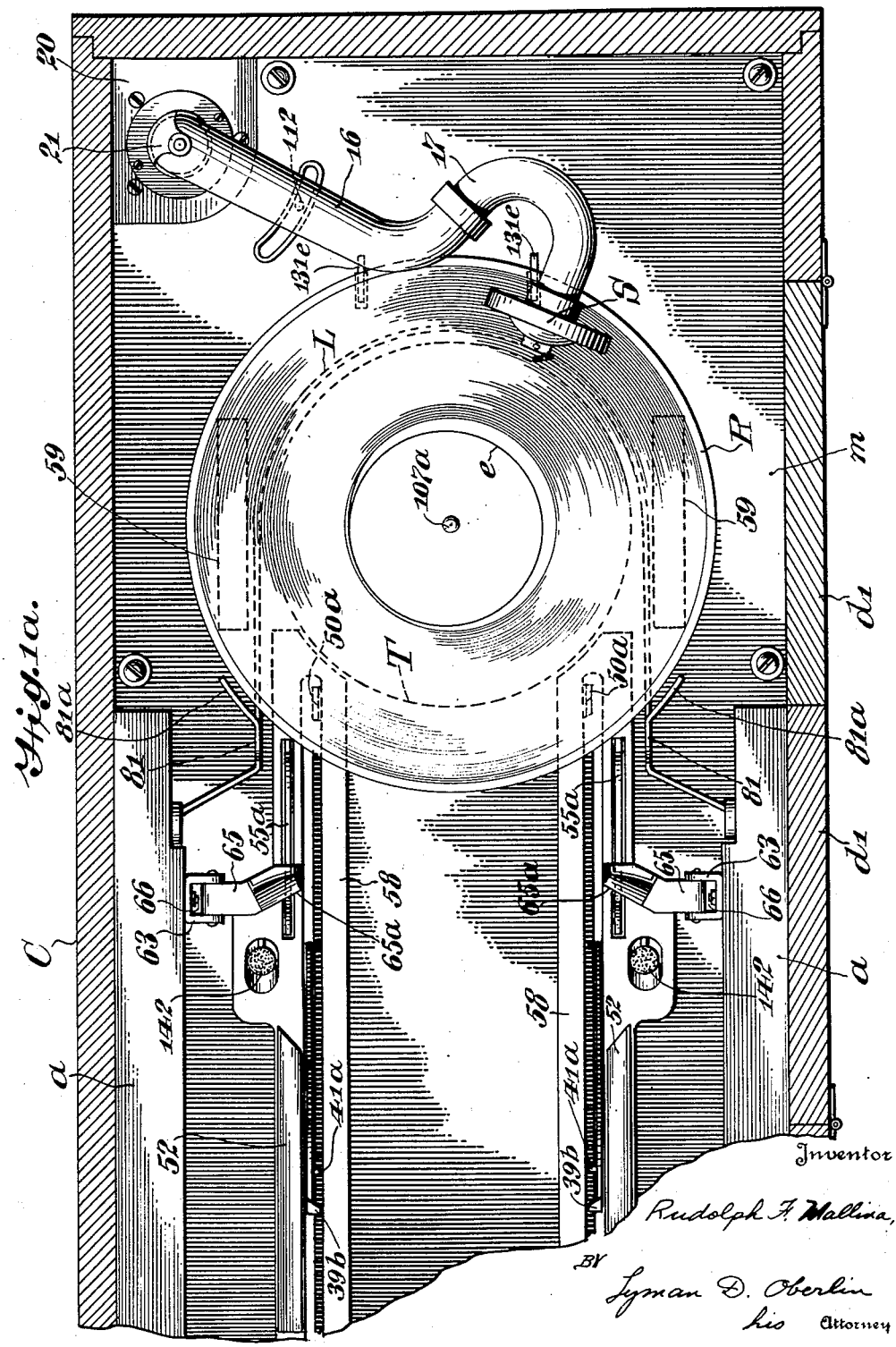

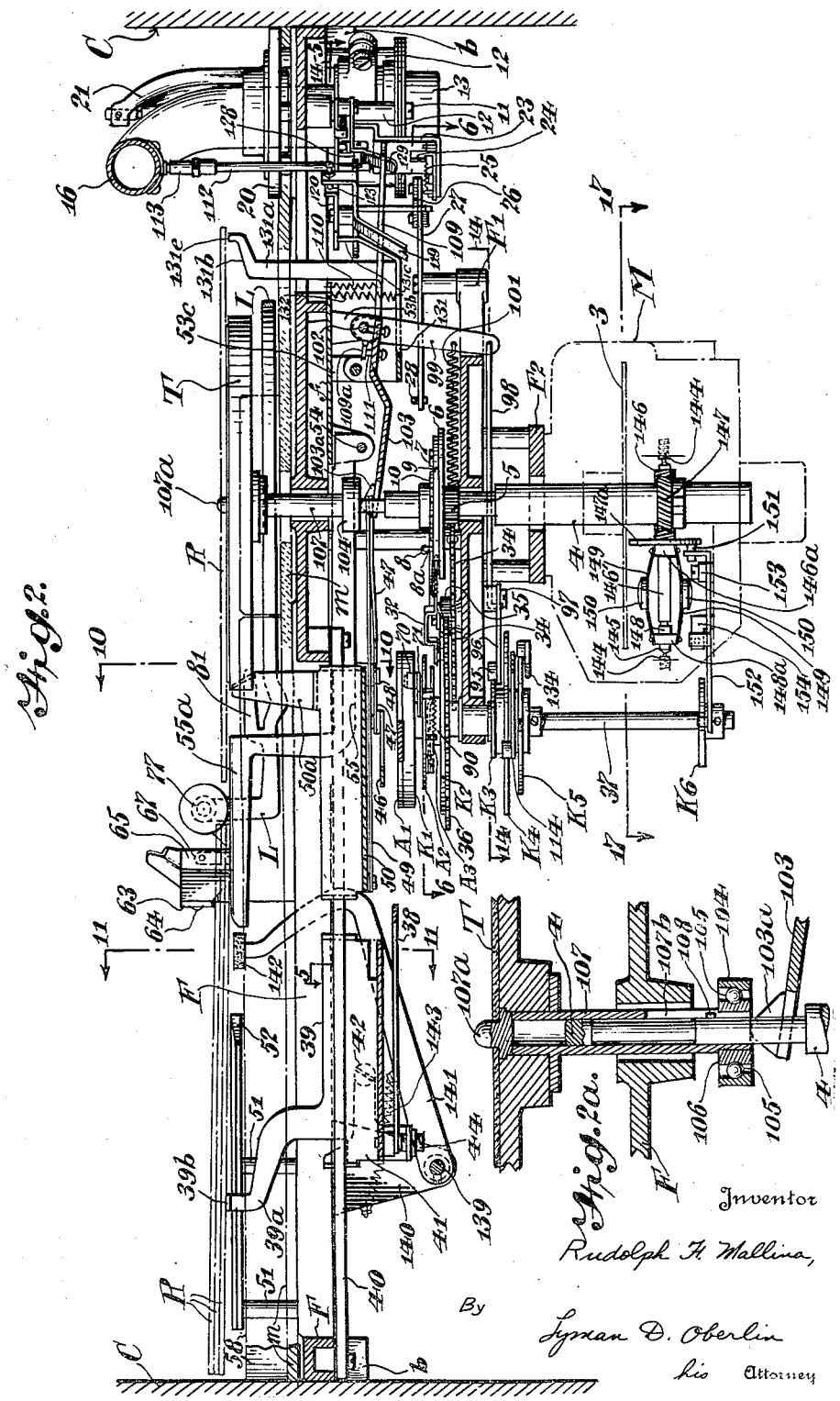

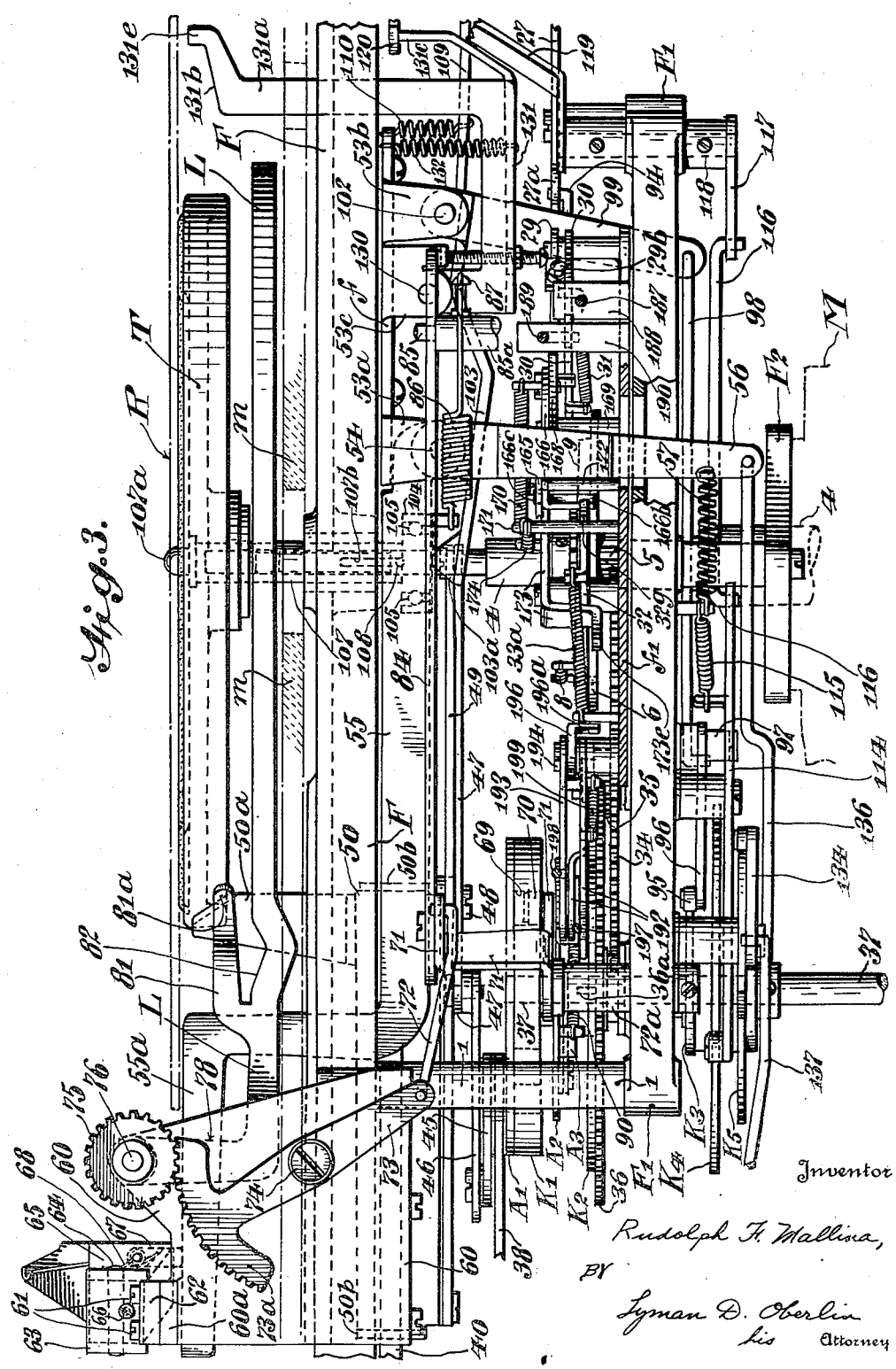

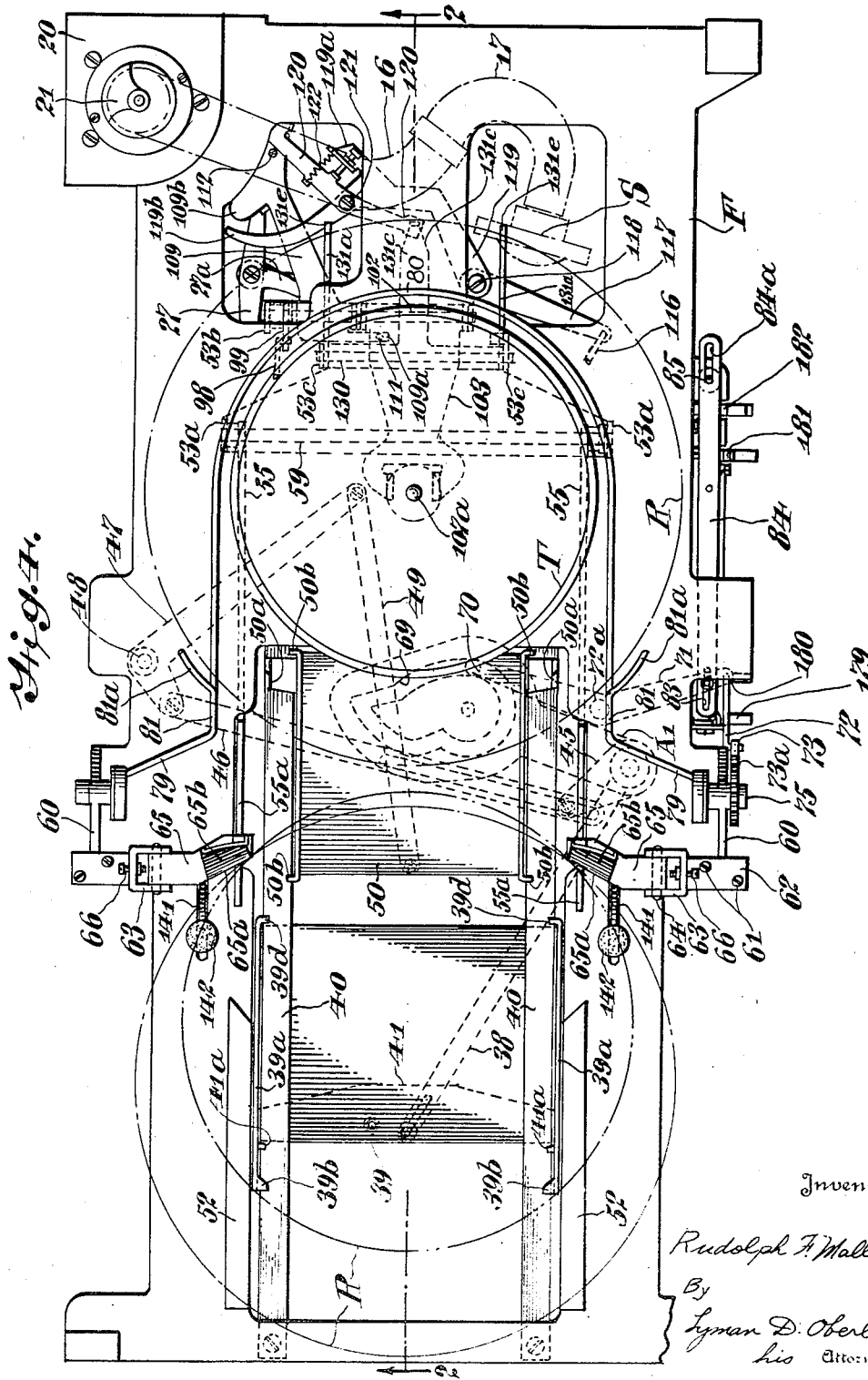

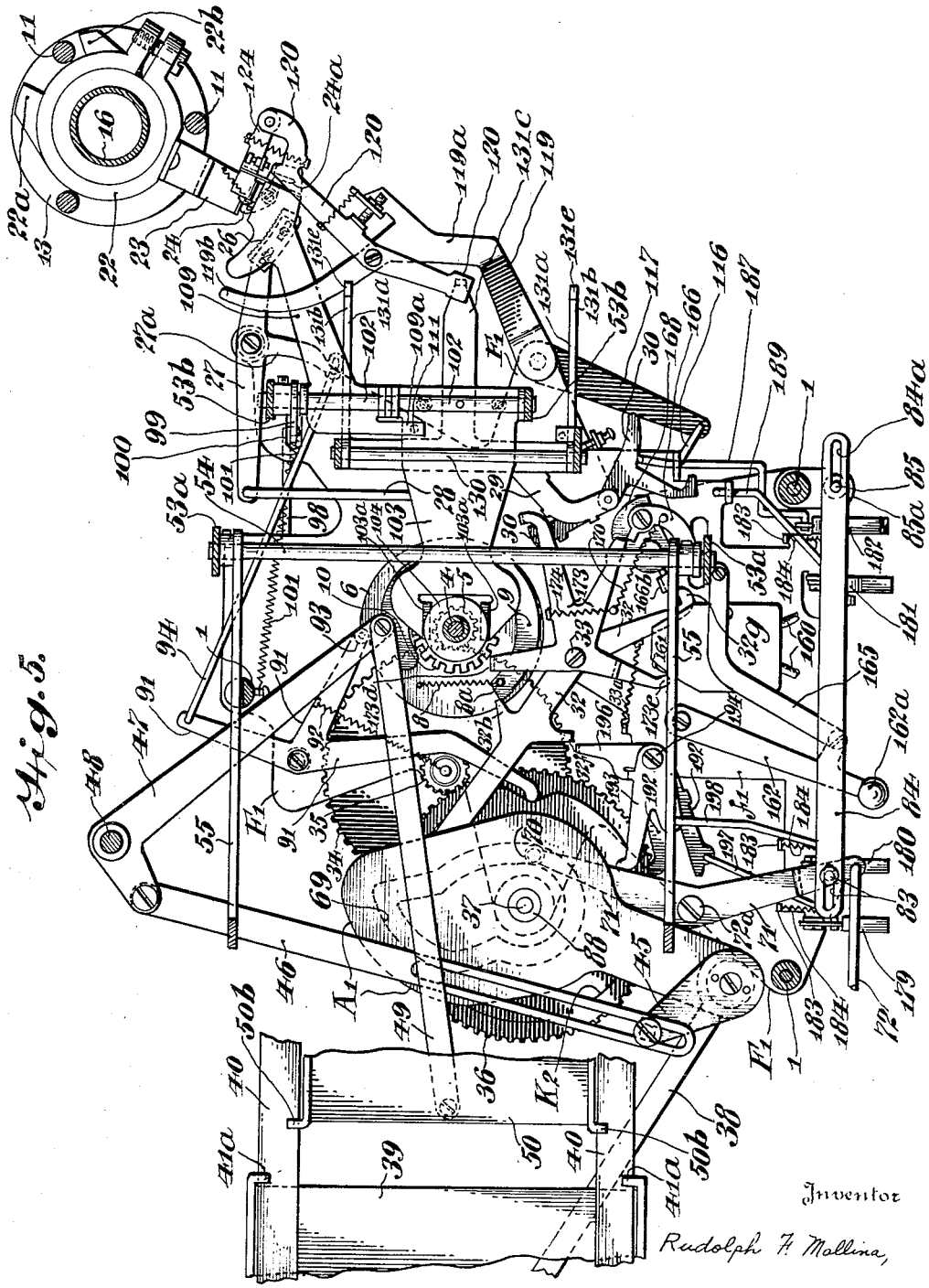

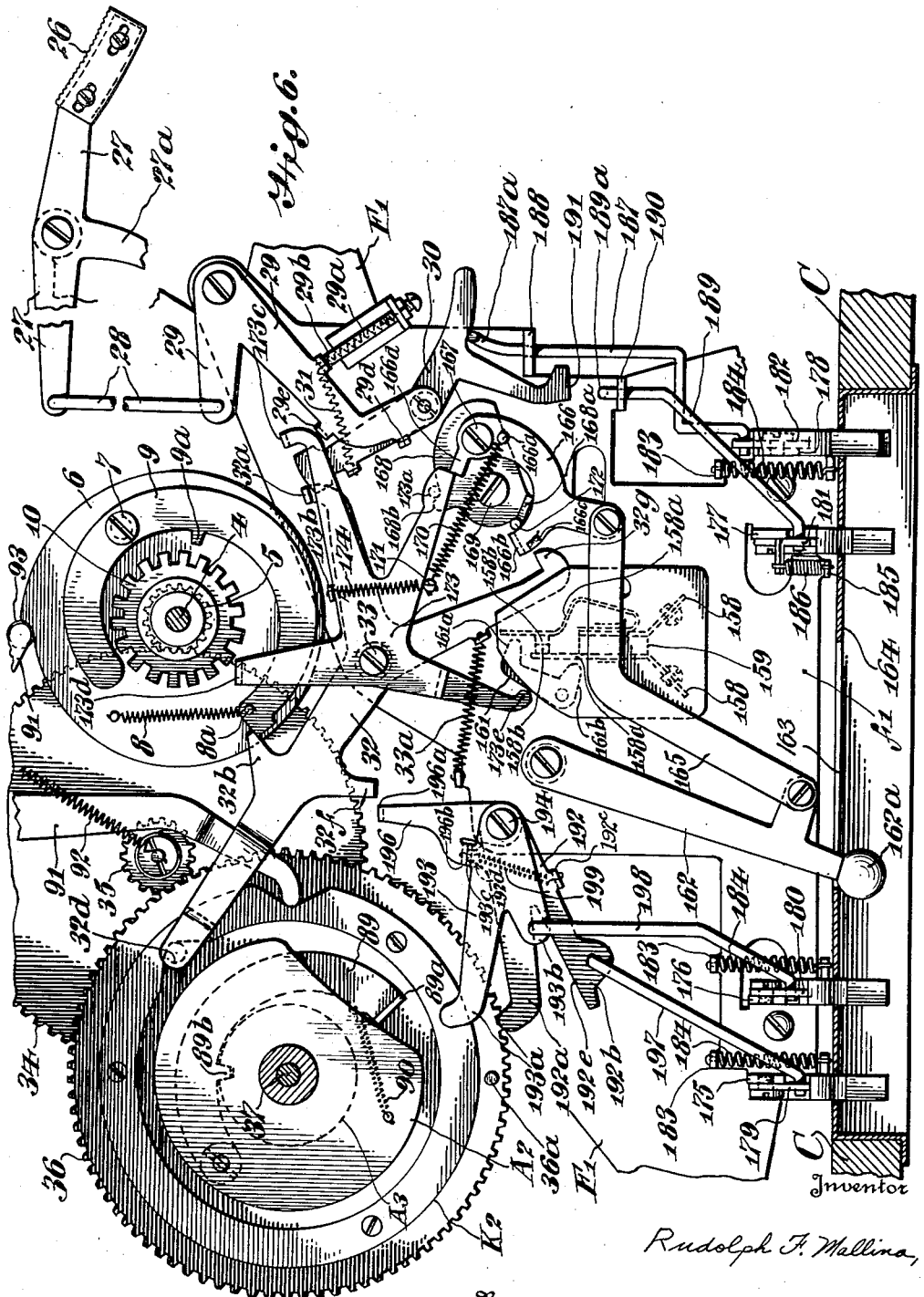

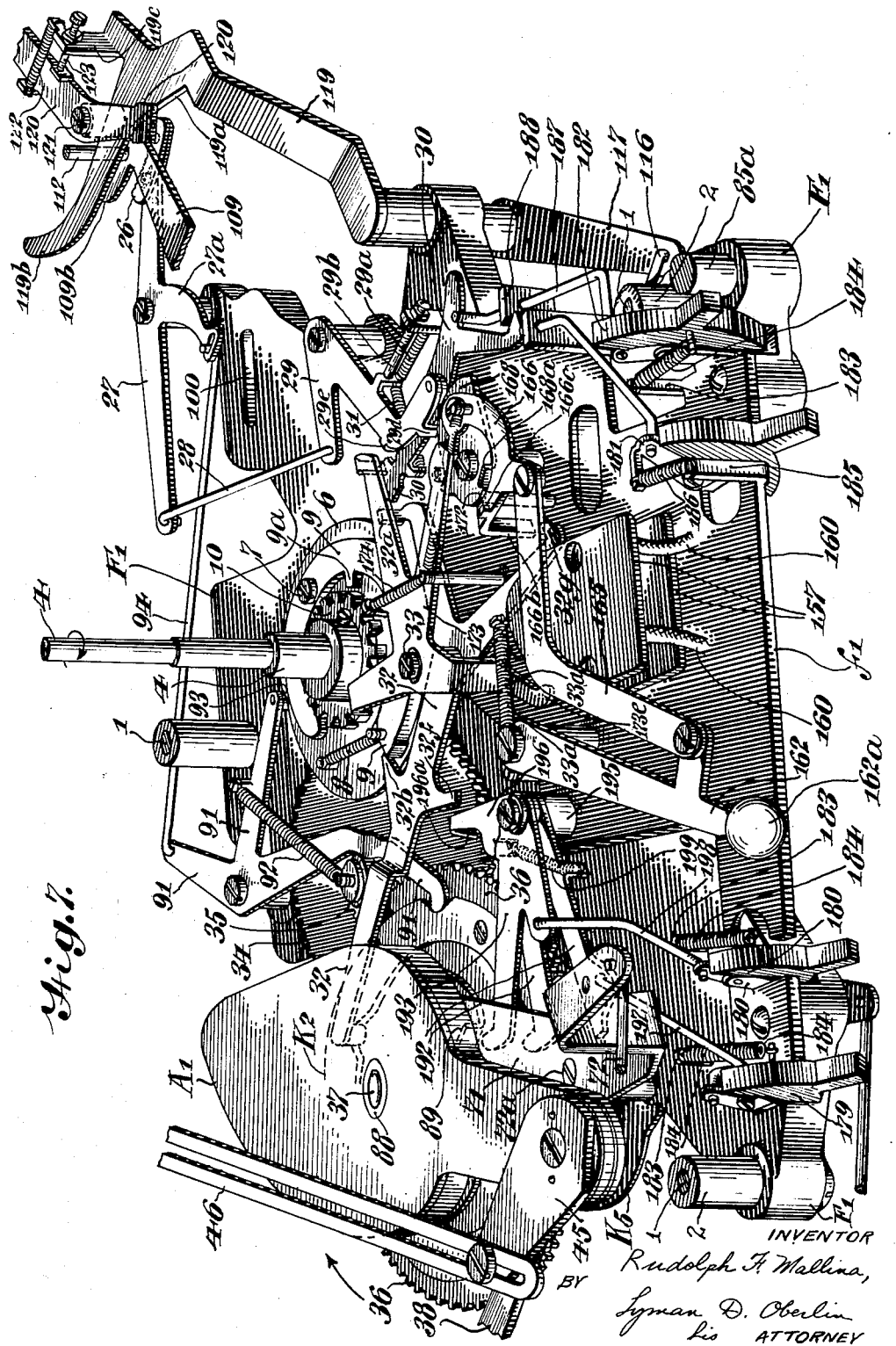

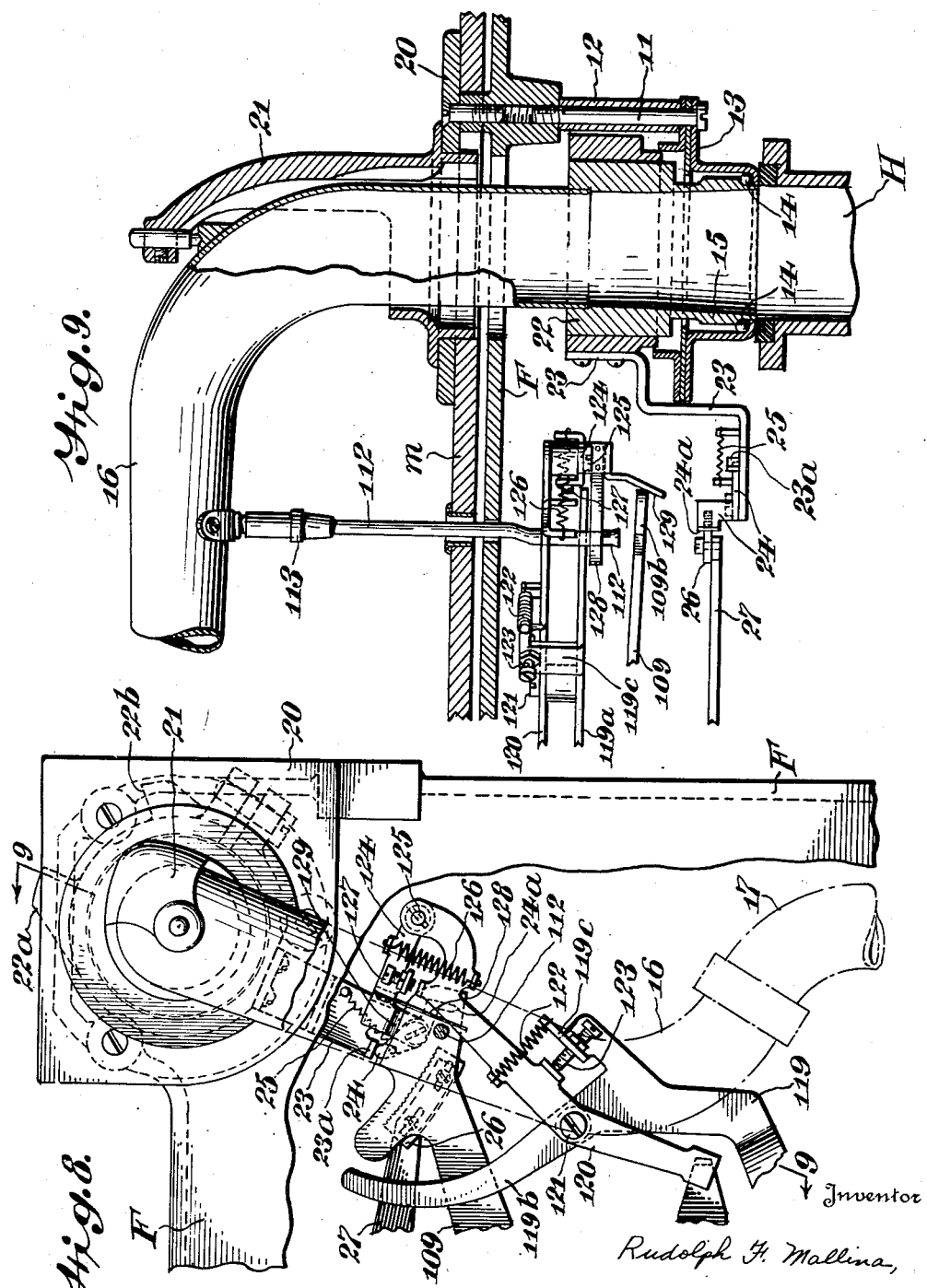

Jan. 26, 1937.　　　　R. F. MALLINA　　　　2,069,041
METHOD OF AND APPARATUS FOR MANIPULATING ARTICLES,
SUCH AS TALKING MACHINE OR PHONOGRAPH RECORDS
Filed Feb. 16, 1929　　　16 Sheets-Sheet 10
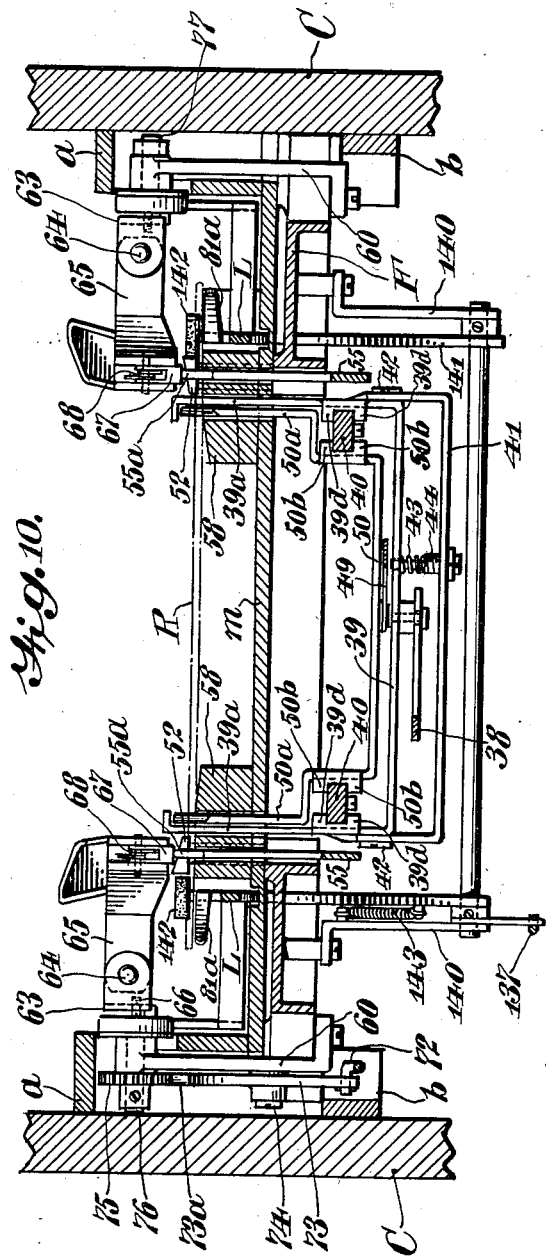
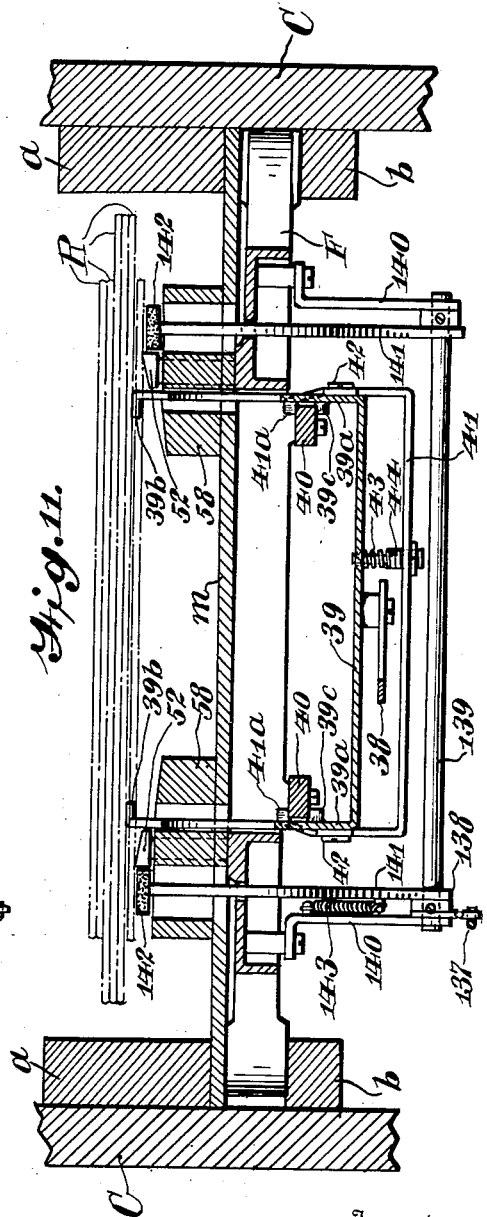
Inventor
Rudolph F. Mallina,
By Lyman D. Oberlin
his Attorney

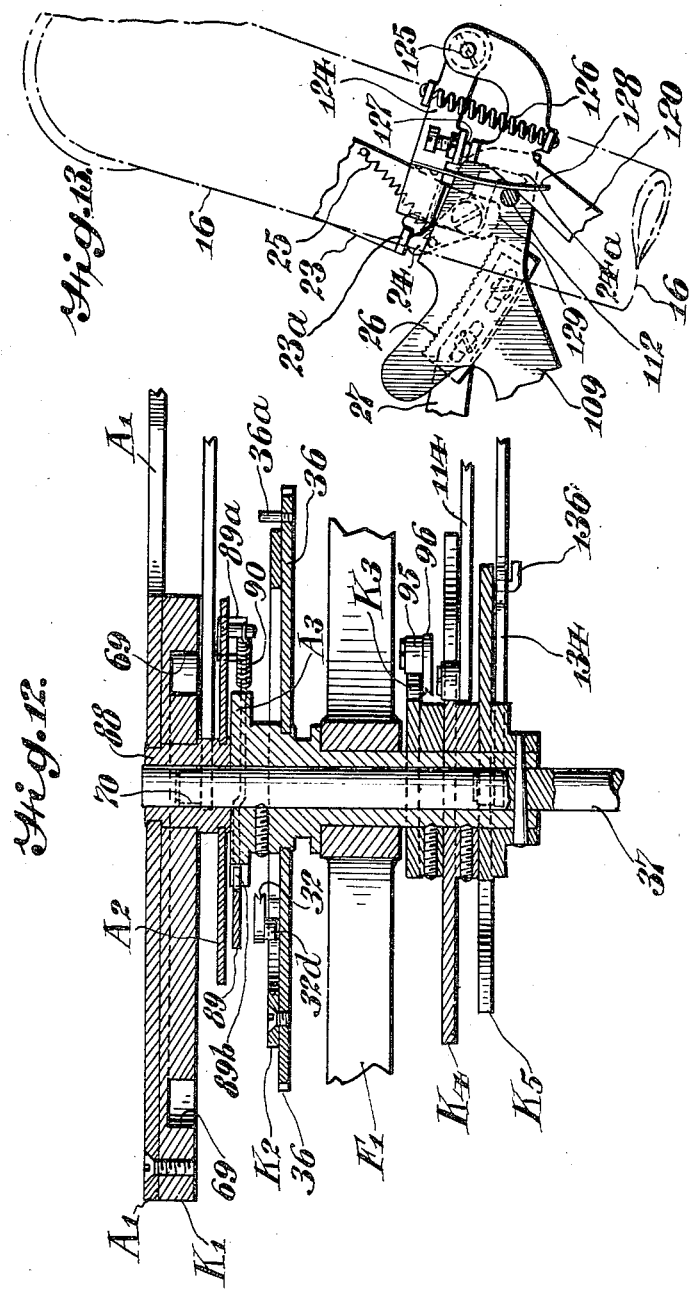

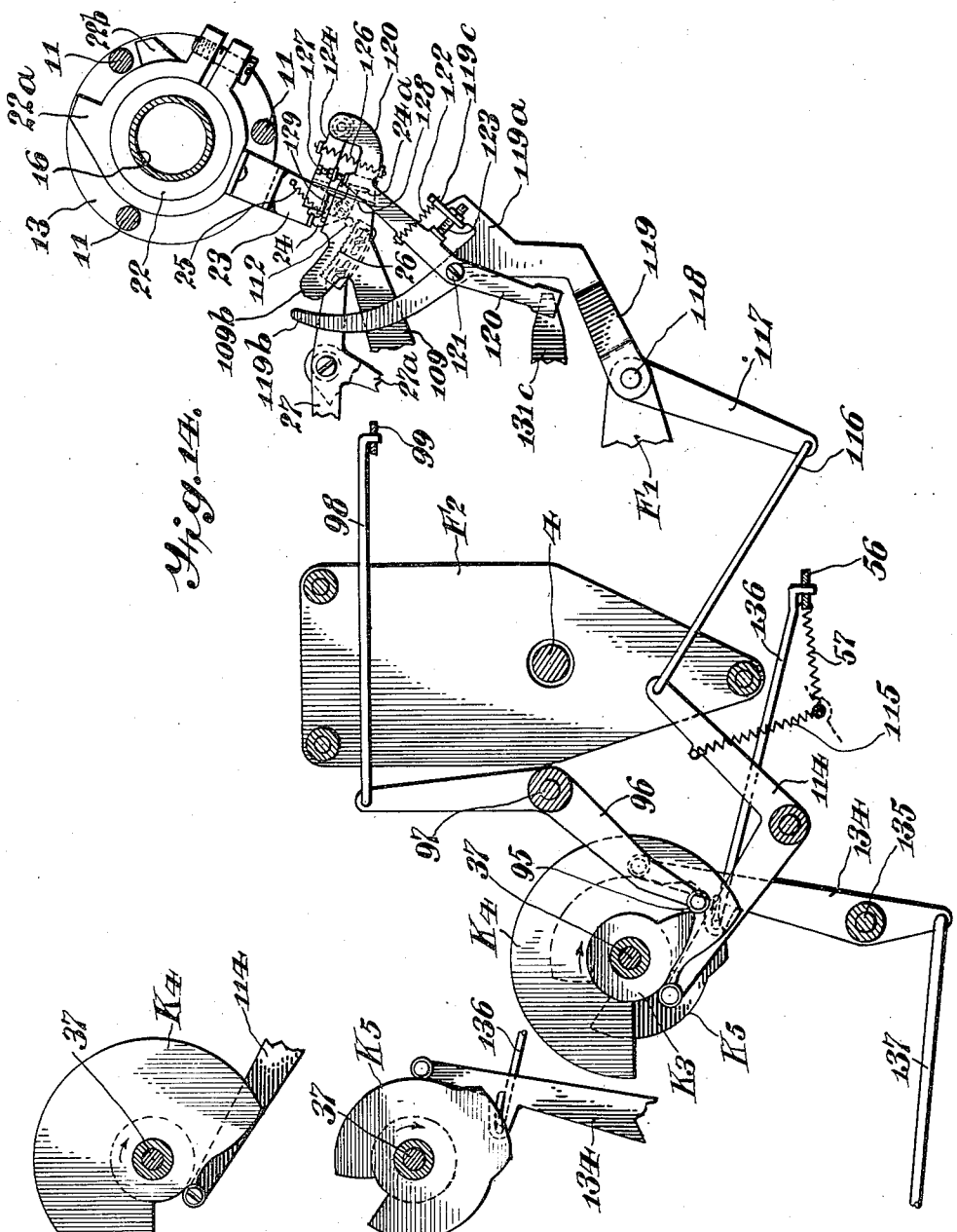

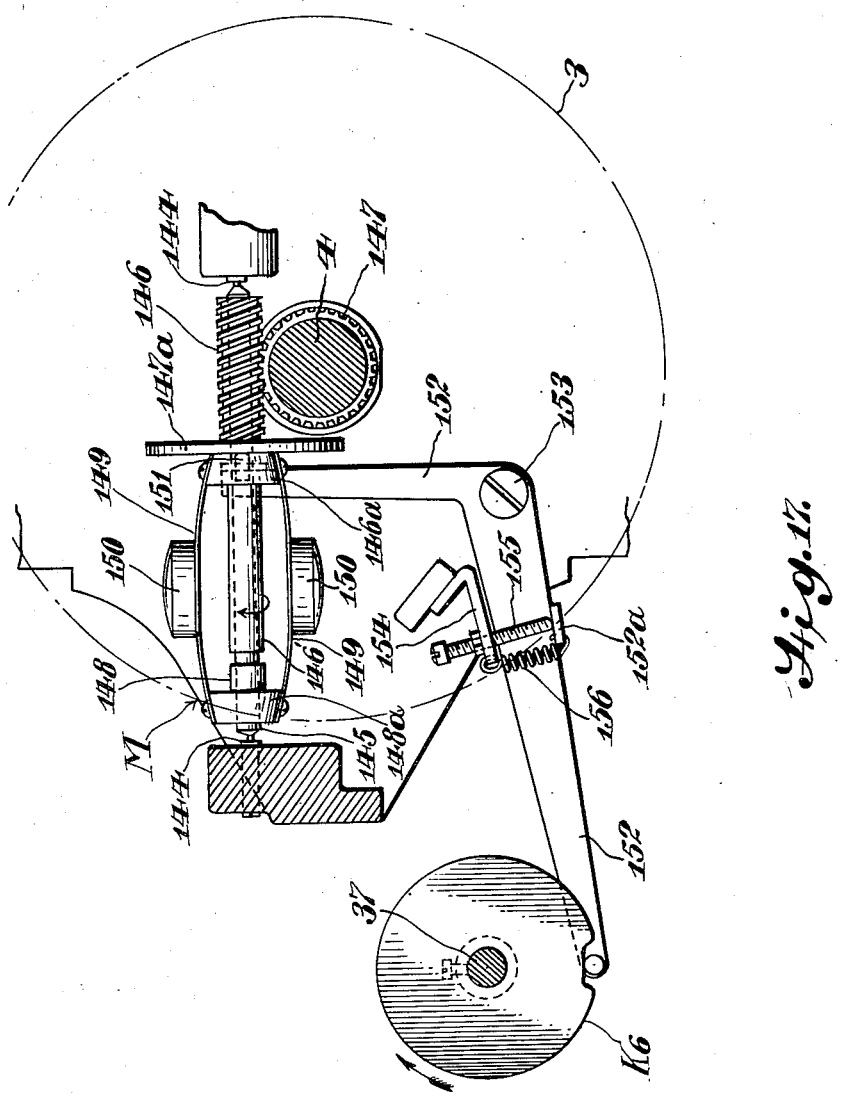

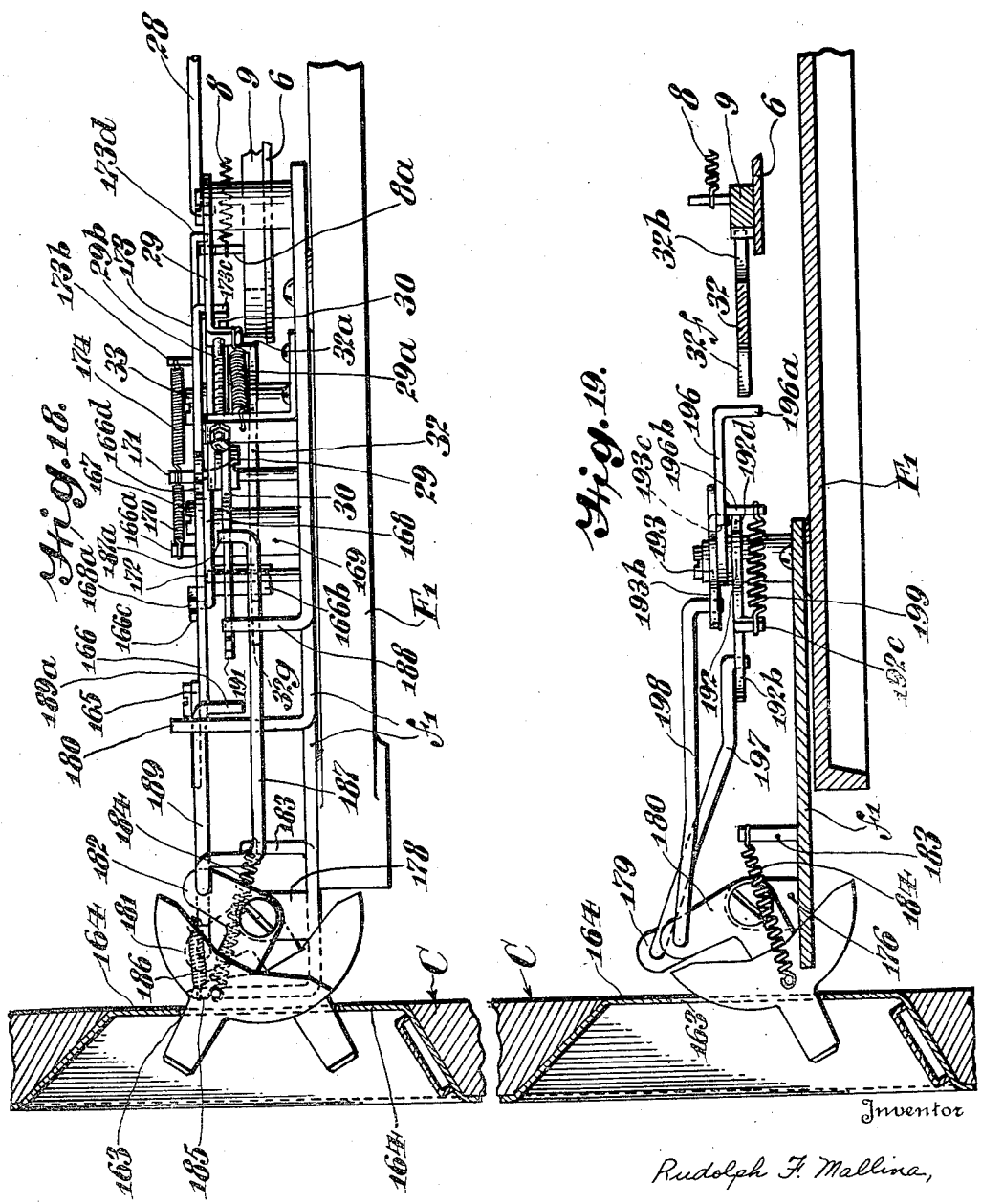

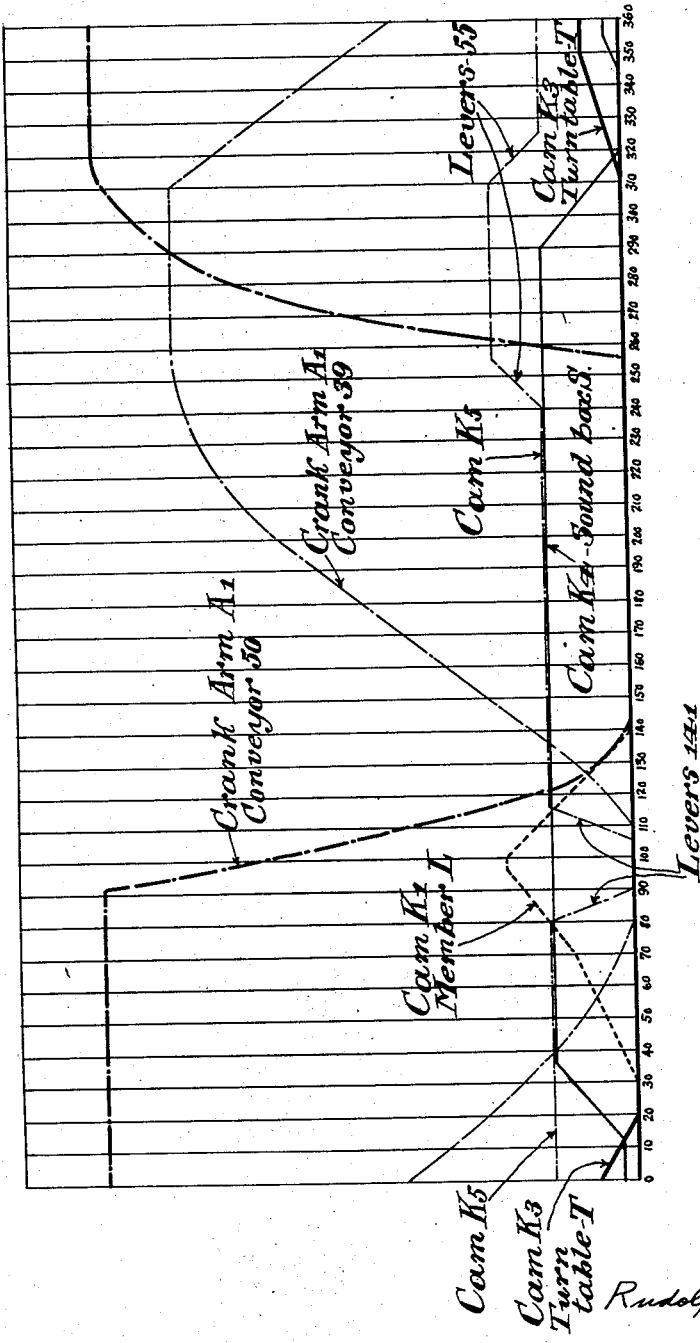

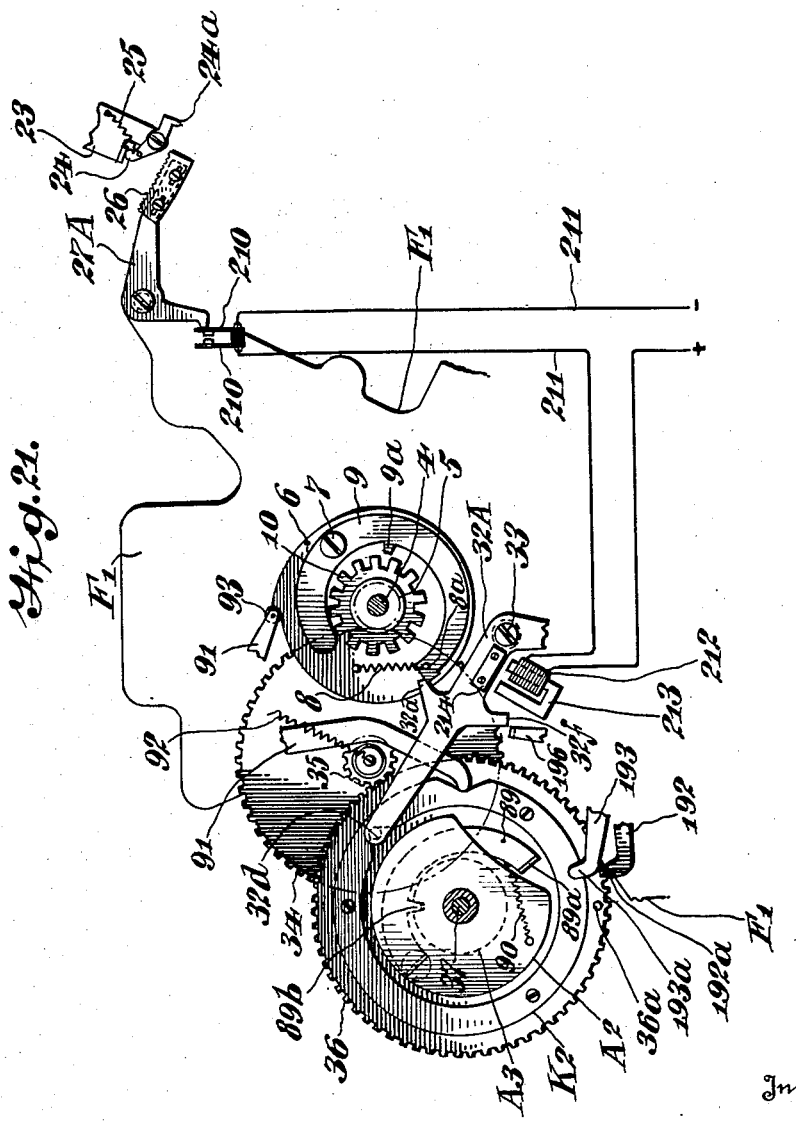

Patented Jan. 26, 1937

2,069,041

UNITED STATES PATENT OFFICE 2,069,041

METHOD OF AND APPARATUS FOR MANIPULATING ARTICLES, SUCH AS TALKING MACHINE OR PHONOGRAPH RECORDS

Rudolph F. Mallina, Atlantic City, N. J., assignor, by mesne assignments, to Radio Corporation of America, New York, N. Y., a corporation of Delaware Application February 16, 1929, Serial No. 340,520

75 Claims. (Cl. 274—10)

My invention relates to a method of and apparatus for manipulating talking machine or phonograph records, such as centrally perforated disk records of a type well known to the art and having sound reproducing groove structure on both sides of each record; my invention also comprehends the manipulation of disks other than talking machine or phonograph records, said last named disks being utilizable for any desired purpose, control or otherwise.

In accordance with my invention, a record, as aforesaid, is transported or conveyed along a path to a position wherein sound is reproduced, said record, thereafter, being removed from said position along a path disposed above said first named path and, more particularly, said record is moved along said second named path in a direction substantially the reverse of the direction taken thereby while moving along said first named path.

Further in accordance with my invention, a record, as aforesaid, rotating with a turntable during a period of sound reproduction is removed from the vicinity thereof and, after substantially continuous movement, is deposited in inverted relation to that occupied thereby during the period of sound reproduction.

Further in accordance with my invention, a record, as aforesaid, is transported along a path from a position of rest to a position wherein sound is reproduced, said record, thereafter, being deposited in or adjacent said position of rest in inverted relation to that occupied thereby during the period of sound reproduction after passage thereof along a path disposed above said first named path.

Further in accordance with my invention, talking machine or phonograph records are transported in succession from a group of superposed records to a position wherein sound is successively reproduced from each record and, after each period of sound reproduction, individual records are returned to the top of the group of superposed records; more particularly, said individual records are deposited at the top of the group of superposed records in inverted relation to that occupied thereby during the respective periods of sound reproduction.

Further in accordance with my invention, records, as aforesaid, are transported in succession from a stack of records to a position wherein sound is successively reproduced from each record and, after each period of sound reproduction, individual records are returnd to the top of the stack of records; more particularly, said individual records are deposited at the top of the stack of records in inverted relation to that occupied thereby during the respective periods of sound reproduction.

Further in accordance with my invention, the respective lowermost records, as aforesaid, of a stack of records are transported in succession to a position wherein sound is successively reproduced from each record and, after each period of sound reproduction, individual records are returned to the top of the stack of records; more particularly, said individual records are deposited at the top of the stack of records in inverted relation to that occupied thereby during the respective periods of sound reproduction.

Further in accordance with my invention, a talking machine or phonograph record is transported or conveyed along a path, moved transversely of said path to carry it to a sound reproducing position and after the period of sound reproduction, is deposited in inverted relation to that occupied thereby during the period of sound reproduction.

Further in accordance with my invention, talking machine or phonograph records are transported in succession along a path leading from a group of superposed records, successively moved transversely of said path to a sound reproducing position and, after the respective periods of sound reproduction, reassociated with the group of superposed records; more particularly, said records are reassociated with the group of superposed records in inverted relation to that occupied thereby during the respective periods of sound reproduction.

Further in accordance with my invention, records, as aforesaid, are transported in succession along a path leading from a stack of records, successively moved transversely of said path to a sound reproducing position and, after the respective periods of sound reproduction, returned to the top of the stack of records; more particularly, said records are deposited at the top of the stack of records in inverted relation to that occupied thereby during the respective periods of sound reproduction.

Further in accordance with my invention, the respective lowermost records, as aforesaid, of a stack of records are transported in succession to a position above a turn table at a plurality of different rates of speed; more particularly, a conveyor, movable slowly and with relatively great power, transports the respective lowermost records partly or entirely from beneath said stack of records, and another conveyor, movable relatively faster and with relatively less power than said first conveyor, transports said records after they are removed from said stack of records.

Further in accordance with my invention, records, as aforesaid, are removed in succession from, or from the vicinity of, a turntable by a member or device partaking of movement along a path simulating the arc of a circle.

Further in accordance with my invention, records, as aforesaid, are transported to a turntable in succession from a group comprising superposed records of different diameters arranged in any desired order, said records, after sound is reproduced therefrom being reassociated with the group of records.

Further in accordance with my invention, an arrangement or system for producing from talking machine or phonograph records periods of sound alternated by periods during which automatic mechanism is operated by a motive device for controlling discharge from and delivery to a turntable of individual records, as aforesaid, comprises control mechanism preventing initiation of operation of said automatic mechanism while said motive device is non-operative.

Further in accordance with my invention, an arrangement or system for producing from talking machine or phonograph records periods of sound alternated by periods during which automatic mechanism is operated by a motive device for controlling discharge from and delivery to a turntable of individual records, as aforesaid, comprises control mechanism preventing discontinuance of operation of said automatic mechanism prior to the conclusion of the normal cycle of operation thereof.

My invention, in one of its important phases, relates to a system or organization for producing sound from a talking machine or phonograph record carried by a turntable, for transporting to said turntable, at the conclusion of a period of sound reproduction, a record comprised in a stack or group of superposed records, and for depositing the record from which sound has just been reproduced on the top of said stack or group of records in inverted relation to that occupied thereby during the period of sound reproduction, said system or organization being automatically operable indefinitely, or for any desired length of time, to successively reproduce sound from one side of all the records and then from the other side of all the records.

My invention resides in the method, arrangement, features of construction, apparatus and mechanism of the character hereinafter described and claimed.

For an understanding of my method and for an illustration of some of the forms my invention may take, reference is to be had to the accompanying drawings in which:

Fig. 1a is a plan view, partly in horizontal section and partly broken away, of the form of my invention illustrated in Fig. 1 but with some of the parts differently positioned.

Fig. 2 is a longitudinal vertical sectional view, partly in elevation, taken on the line 2—2 of Fig. 4 and looking in the direction of the arrows.

Fig. 2a is a vertical sectional view, partly in elevation, of mechanism for reciprocatorily supporting a turntable.

Fig. 3 is an enlarged, side elevational view, partly in section, of apparatus or mechanism constructed in accordance with my invention.

Fig. 4 is a plan view corresponding with Fig. 1a and omitting a transverse casing wall or motor board to show the parts therebeneath.

Fig. 5 is a horizontal sectional view, partly in plan, and is taken on the line 8—8 of Fig. 2.

Fig. 6 is a horizontal sectional view, partly in plan, and is taken on the line 6—6 of Fig. 2.

Fig. 7 is a perspective view illustrating mechanism constructed in accordance with my invention.

Fig. 8 is a plan view, with parts broken away, of a tone arm or taper tube mounting arrangement and mechanism associated therewith.

Fig. 9 is a vertical sectional view, partly in elevation, and is taken on the line 9—9 of Fig. 8.

Figs. 10 and 11 are transverse vertical sectional views taken, respectively, on the lines 10—10 and 11—11 of Fig. 2.

Fig. 12 is a vertical sectional view, partly in elevation, of cams and crank arms and their supporting shaft.

Fig. 13 is a plan view, partly in section, corresponding somewhat with Fig. 8, but showing another position of the parts.

Fig. 14 is a horizontal sectional view, partly in plan, and is taken on the line 14—14 of Fig. 2.

Figs. 15 and 16 are plan views of cams appearing in Fig. 14.

Fig. 17 is a horizontal sectional view, partly in plan, and is taken on the line 17—17 of Fig. 2.

Figs. 18 and 19 are vertical sectional views, partly in elevation, of manually controlled devices utilizable in accordance with my invention.

Fig. 20 is a timing chart of various cam and crank arm motions.

Fig. 21 is a semi-diagrammatic view of an electro-mechanical arrangement for effecting a control.

Figure 1:
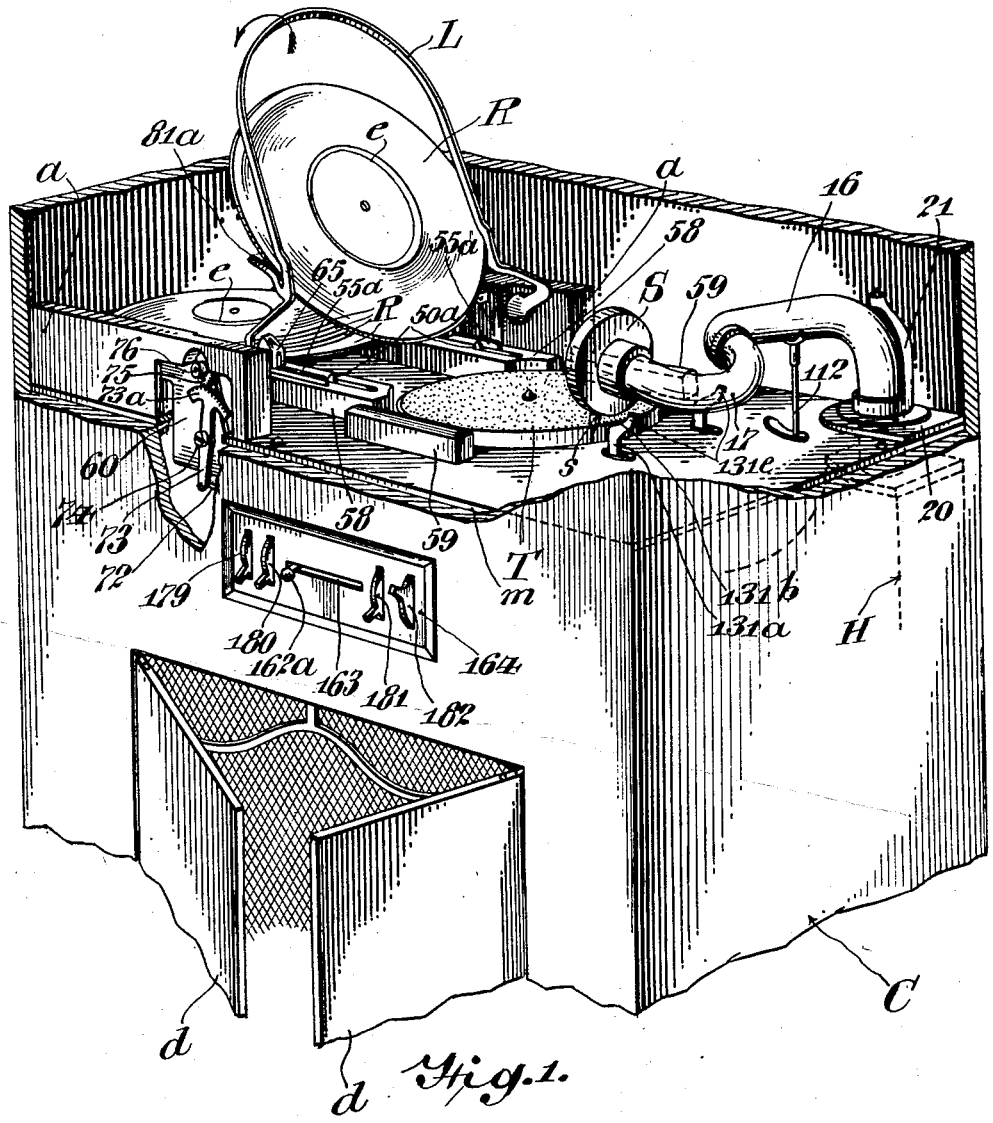
Figure 1 is a perspective view, with parts broken away, of a talking machine or phonograph system, arrangement, mechanism or apparatus.

Referring particularly to Figs. 1 and 1a, there is illustrated a suitable cabinet, casing or housing C, usually substantially rectangular, and having a suitably supported transverse wall, member or motor board m below which, in the example shown, is disposed suitable horn structure H from which sound waves pass through an orifice or passage in the front casing wall, said orifice or passage, in the example shown, adapted to be closed, if desired, by one or more doors d.

Above the motor board m is a compartment or chamber to which access may be had by one or more doors d1 comprised in the front wall of casing C. Disposed in said compartment and at one side of the casing C, either on or above the motor board m is suitable supporting structure for one or more talking machine or phonograph records R positioned, in the example shown, in a magazine formed by a casing side wall and spaced members or walls a upstanding from the motor board m. Each record R, in the example illustrated, is a centrally perforated, circular disk having on each flat surface a spiral groove utilizable for the production of intelligent sound, each spiral groove terminating in and communicating with a groove e eccentrically disposed with respect to the record perforation.

As generally described above, a plurality of records R may be suitably arranged at one side of the casing C, as in stacked formation, that is, in superposed, contacting relation wherein one record directly engages and is supported by another.

In accordance with my invention, from such stack of records, or equivalent, individual records R are transported at suitable intervals to a region, wherein sound is reproduced therefrom, the individual records R, then, in accordance with one prominent phase of my invention, being transported back to the stack of records and reassociated therewith or deposited on the top thereof in inverted relation to that occupied thereby during the period of sound reproduction. To this end, individual records R may be transported to and temporarily left stationary in a region directly above a vertically movable or reciprocatory turntable T by which each record is elevated for coaction with a stylus s, or equivalent, of a sound box S, or equivalent; each record R, after sound has been reproduced therefrom, being transported back to the top of the stack of records by a member L movable substantially in an arc of a circle.

More specifically, one form of mechanism constructed in accordance with my invention, is illustrated as comprising an upper supporting plate or frame member F carrying the aforesaid motor board m and supported itself by members b projecting from the inner surfaces of opposite walls of the casing C, Figs. 2 and 3. The frame member F supports, in suitable spaced relation, an intermediate supporting plate or frame member F1, in turn, supporting a lower supporting plate or frame member F2. In the example illustrated, a plurality of standards 1, Fig. 7, depend from the frame member F and, to the lower ends thereof, the frame member F1 is secured, said frame members F and F1 being maintained in spaced relation by sleeves 2 receiving the respective standards 1. Similarly, a plurality of standards and sleeves maintain the frame members F1 and F2 in spaced relation, Fig. 2. The aforesaid frame members constitute a structure upon which is mounted or which carries the hereinafter described mechanism.

Depending from the frame member F2 and suitably connected thereto is a motive device M of any suitable construction and from which power is obtained to rotate the turn table T and to periodically operate the automatic mechanism hereinafter to be described. In the example shown, the motive device M is an electric motor of the induction disk type and comprises a disk or armature 3, Figs. 2 and 17, carried by the suitably journaled, vertical motor shaft 4, there being suitable coil structure, not shown, for rotating the disk 3 and the thereto-secured shaft 4.

Loosely mounted on the shaft 4 is a pinion 5, Figs. 2 and 3, having secured thereto a clutch plate 6, Figs. 2, 3, 6 and 7, also loosely encircling the shaft 4. Pivoted at 7 to the clutch plate 6 and biased in a clockwise direction, Figs. 6 and 7, by a helical spring 8, or equivalent, is a clutch segment 9 comprising a tooth 9a adapted to move between adjacent teeth of a clutch wheel or spider 10 keyed to the shaft 4, said helical spring 8 being connected to a pin 8a upstanding from the clutch segment 9 and to another pin upstanding from the clutch plate 6.

As hereinafter described, the aforesaid pinion 5 is periodically secured, by the above-described clutch mechanism, to the shaft 4 to rotate therewith. During such periods, the machine is said to be "in cycle" and during these periods, the automatic mechanism is in operation under the control of said pinion 5. Of the drawings, only Figs. 1 and 13 are illustrative of the machine while thus "in cycle".

Initiation of automatic cycle as effected by a record R

Figure 1B:
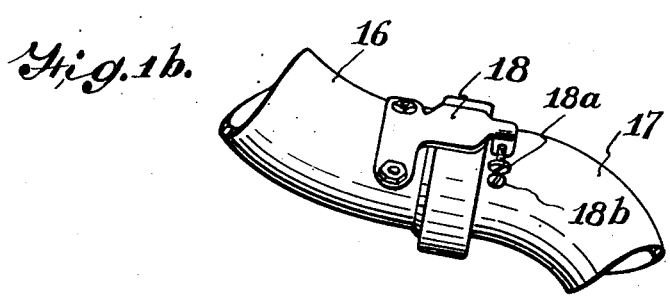
Fig. 1b is an inverted plan view of stop members for limiting oscillatory movement of a sound box, or equivalent.

Referring to Figs. 8 and 9, the frame member F, at one corner thereof, is shown as having a plurality of standards 11 depending therefrom which, in conjunction with encircling sleeves 12, maintain a bearing member 13 properly spaced from said frame member F. Coacting with antifriction members 14 in the open end of bearing member 13 is the lower end 15 of a tone arm or taper tube 16 having, at the extremity of its horizontal arm, a goose neck 17 oscillatorily mounted thereon; goose neck 17, in turn, carries the aforesaid sound box S; sound waves, in the example shown, being produced by the sound box diaphragm, transmitted through the tone arm 16 and discharged from the lower end 15 thereof into the end of the sound amplifying horn H which is associated with the end of the bearing member 13. As shown in Fig. 1b, the tone arm 16 carries a bracket or supporting member 18, in turn, carrying a screw 18a, or equivalent, adjustably mounted thereon and coacting with a stop member 18b carried by the goose neck 17. By virtue of this arrangement, oscillatory movement of the sound box S is limited, said stop members 18a and 18b preventing downward movement thereof, under the influence of gravity, from the position illustrated in Fig. 1.

The frame member F is suitably apertured for the reception of tone arm 16 as is the motor board m which, in the example illustrated, carries a plate 20 on which rests the supporting member 21 for the tone arm or taper tube 16.

Carried by the lower end 15 of the tone arm 16 is a sleeve 22 having spaced abutments or lugs 22a and 22b, Figs. 4, 5 and 8, coacting with one of the standards 11 and its encircling sleeve 12 to limit unwarranted oscillatory movement of the tone arm. Secured to the sleeve 22 is a downwardly extending arm or member 23, Figs. 2 and 9, terminating in a horizontal section on which is pivoted an actuating member or pawl 24 biased in a clockwise direction, Figs. 5 and 8, into engagement with a lug or abutment 23a on arm 23 by a helical spring 25, or equivalent.

Pawl 24 comprises an edged surface 24a for coaction with a rack member 26, Figs. 5, 7 and 8, adjustably mounted on one end of a lever 27 pivoted to and spaced above the upper surface of frame member F1. Pivoted to the other end of lever 27 is one end of a link 28, the other end of which is pivoted to one end of a V-shaped lever 29 pivoted to and spaced above a plate-like member f1 carried by the frame member F1 and positioned above its upper surface. Lever 29 is biased by a helical spring 29a, or equivalent, in a counter-clockwise direction, Figs. 6 and 7, into engagement with a stop member 29b adjustably carried by a lug upstanding from the plate f1. Lever 29 carries and has pivoted thereto a lever 30 biased in a clockwise direction, Figs. 5, 6 and 7, by a helical spring 31, or equivalent, connected to lugs projecting, respectively, from the levers 29 and 30. At its end nearer the spring 31, lever 30 is adapted to engage a lug 32a projecting from a generally Y-shaped lever 32 spaced above the member f1, mounted on a pin 33 carried thereby, and biased in a clockwise direction, Figs. 6 and 7, by a helical spring 33a connected to said lever 32 and to a lug upstanding from the plate f1. Lever 32 comprises a nose or extension 32b for coaction with one end of the aforesaid clutch segment 9.

During a period of sound reproduction, the sound box S moves along the arc of a circle from right to left, Fig. 1a across the face of a record R rotating with the turntable T, the tone arm 16 swinging in a clockwise direction, Fig. 1a, and the pawl 24 moving across the face of rack member 26, the edged surface 24a of said pawl idling over the rack serrations. Eventually, after cessation of sound, the stylus s of the sound box S engages the eccentric groove e of said last named record and, as a result, the stylus s, sound box S and tone arm 16 are moved in a direction the reverse of the direction taken thereby during the period of sound reproduction. The pawl 24 is similarly moved in reverse direction but, in so doing, the teeth or serrations of rack member 26 exercise a clutching effect thereon. As a result, lever 27 swings clockwise, Figs. 5, 6 and 7, and link 28 moves lever 29 in a similar direction; lever 30, carried by lever 29, engages the lug 32a of lever 32 swinging the latter in a counter-clockwise direction, Figs. 5, 6 and 7, to thereby disengage the nose 32b from the end of clutch segment 9. Thereupon, spring 8 swings clutch segment 9 about its pivot and the tooth 9a engages the clutch wheel 10. In this manner, the pinion 5 is connected to the constantly rotating shaft 4 and the cycle of the automatic mechanism is started.

*Cam and crank arm mechanism*

Referring to Figs. 2, 3 and 7, the pinion 5 is shown as meshing with and driving a gear 34 spaced from the frame member F1 and mounted on a stub shaft projecting thereabove. Mounted on the same stub shaft and movable with gear 34 is a pinion 35 meshing with and driving a gear 36 for operating a suitably journalled cam and crank arm shaft 37 disposed in parallel relation with respect to the drive shaft 4 and moving once through an angle of 360 degrees for each cycle of automatic operation. Gear 36 is provided with a lateral projection or pin 36a, Figs. 6 and 12, utilizable as hereinafter described.

From top to bottom, and as illustrated in Figs. 3 and 12 shaft 37 carries, in the order named, a member A1 forming a crank arm for operating a plurality of conveyers for individually and successively transporting records into the path of the turntable T; a cam K1 controlling removal of individual records from the turntable T or the vicinity thereof; a member A2 forming a clutch-segment-carrying plate; a member A3 forming a clutch wheel; a cam K2 controlling the main clutch mechanism; a cam K3 for elevating the turntable T; a cam K4 controlling oscillatory movement of the tone arm 16 and sound box S; a cam K5 having the function (1) of controlling the passage of records from the region into which delivered by the first-stage feeding mechanism, and (2) of controlling members toward which records are passed by the member L; and a cam K6, Figs. 2 and 17, controlling the speed of the motor M.

*Delivery of individual records into the path of the turntable T*

Referring to Figs. 3, 4, 5 and 7, the crank arm A1 is shown as having pivoted thereto one end of a link 38, the other end of which is slotted to provide lost motion and pivoted to a slide or conveyer 39 forming the first-stage mechanism for transporting individual records R toward the path of the turntable T. In the example illustrated and as shown in Figs. 2, 4, 10 and 11, the conveyer 39 comprises a channel-shaped member having vertical upstanding walls 39a terminating, respectively, in angular fingers or extensions 39b beveled as indicated in Fig. 4 for direct coaction with individual records R. Secured to the lower side of frame member F is a track structure comprising the spaced members or bars 40 with the lower outer side of each of which coacts a lug or guiding member 39c formed preferably integrally with the aforesaid channel shaped member at the rear thereof, Fig. 11. At its front end, Fig. 10, said last named channel shaped member comprises spaced lugs or guiding members 39d at each side thereof, sets of said lugs 39d coacting with the respective bars 40. A channel-shaped member 41 mounted on pivot pins 42 carried by member 39 has lugs or guiding members 41a formed preferably integrally therewith for coaction with the upper outer surfaces of the respective bars 40, said lugs 41a mating with the lugs 39c of conveyer 39, Fig. 11. Disposed between the members 39 and 41 and biasing the latter upwardly is a helical spring 43 or equivalent, the expansive tendency of which may be controlled by a screw 44, Fig. 11. By virtue of the arrangement just described, the first-stage feeding mechanism comprising the conveyer 39 is guided for reciprocatory movement along the bars 40 toward and from the turntable T.

Referring to Figs. 4 and 7, the crank arm A1 is shown as having an angular extension 45 to which, through a lost motion slot, one end of a link 46 is pivoted, the other end of said link 46 being pivoted to one leg of a bell crank lever 47, Figs. 4 and 5, fulcrumed at 48 on the frame member F. The other leg of lever 47 is pivoted to one end of a link 49 pivoted, at its other end, to a slide or conveyer 50 forming the second-stage mechansim for transporting individual records into the path of the turntable T. Referring to Fig. 10, the conveyer 50 is shown as a channel-shaped member and comprises horizontal portions overlying the respective bars 40 above which, at the front end of said last named channel-shaped member, vertically extend the respective standards 50a, the upper ends of which have beveled surfaces, Fig. 10, for direct engagement with individual records as they are transported thereby toward the turntable T. Formed preferably integrally with the lower vertical sides of conveyer 50, at the front and rear thereof, are flanges forming sets of upper and lower guiding members or lugs 50b for coaction with the upper and lower inner surfaces of the respective bars 40. By virtue of the arrangement just described, the second-stage feeding mechanism is guided for reciprocatory movement along the bars 40 toward and from the turntable T.

Referring to Figs. 2 and 11, a plurality of groups of standards 51 are shown as projecting from and above the frame member F, each group of standards 51 carrying a supporting member 52. The members 52 serve as a supporting structure for a group or stack of the records R and, in the example shown, said members 52 are positioned, respectively, exteriorly of the vertical walls 39a of carriage 39.

Carried by the frame member F and positioned below its lower surface is a supporting plate or member f, Figs. 2 and 3, having depending, alined ears or projections 53a in which is rotatably supported a rod or shaft 54 having a pair of spaced members 55 keyed or otherwise fixed thereto for oscillatory movement therewith. As well illustrated in Fig. 3, the members 55 extend from right to left in substantially a horizontal direction, then substantially vertically, each terminating in an elongated section 55a having its upper surface disposed substantially horizontally. Keyed or otherwise fixed to the shaft 54 for oscillatory movement therewith is a lever 56, Figs. 2 and 3, periodically actuated, as hereinafter described, and suitably biased in a clockwise direction, Figs. 2 and 3, as by a helical spring 57 secured at one end to said lever 56 and at its other end to a lug depending from the frame member F1. Spring 57 moves the sections 55a upwardly, Fig. 3, until the upper surfaces of the lower horizontal sections of the members 55 engage the lower surfaces of the frame member F. In this position, the upper surfaces of the sections 55a are substantially in horizontal alinement with the upper surfaces of the members 52, Fig. 10.

As illustrated in Figs. 1, 10 and 11, the motor board m, on its upper surface, carries spaced, horizontal strips or members 58, preferably of wood, for slidably supporting individual records R as they are advanced toward the turntable T, all as hereinafter described. Furthermore, on each side of the turntable T, there are disposed similar horizontal strips or members 59 for supporting individual records R while they remain stationary waiting to be elevated to sound reproducing position. As further illustrated in said Figs. 1, 10 and 11, the motor board m and the members 58 carried thereby are provided with slots or passages through which horizontally travel the vertical members 39a and 50a of the respective record transporting conveyors. Also, the motor board m and the members 58 are provided with other parallel slots or passages, Fig. 10, through which vertically travel the horizontal portions 55a of the members 55.

Referring to Figs. 2, 3, 4, and 10, the motor board m and the magazine walls a are suitably apertured or chambered for the reception of standards 60 upstanding from the frame member F, each standard 60 comprising a flanged section 60a. Resting on each section 60a and suitably secured thereto, as by screws 61, is a member 62 terminating in a U-shaped bracket 63. As well illustrated in Fig. 4, the brackets 63 face one another and each, on a pivot 64, supports a record stripper member 65, downward movement of which is suitably limited, as by a set-screw 66 threaded in the bracket 63. Pivoted in a suitable recess or open channel in each member 65 is a dog 67 biased in a clockwise direction, Fig. 3, by a spring 68 or the like. As shown in Fig. 10, the dogs 67 rest on the respective sections 55a and normally maintain the bottom surfaces of the stripper members 65 spaced from the respective sections 55a a distance slightly greater than the thickness of a record R. As illustrated in Fig. 4, the stripper members 65 comprise vertical faces 65a with which are adapted to coact all records R in the stack of records save the bottom-most record R, said stripper members 65 also comprising inclined faces 65b utilizable as hereinafter described.

With the automatic mechanism out of cycle and during a period while sound is being reproduced, the normal positions of the parts are as follows:

The horizontal sections 55a, under the influence of spring 57, are in their upper positions, that is, the upper surfaces of said members 55a are substantially in horizontal alinement with the uppermost surfaces of the supporting members 52.

The stack of records occupies the position indicated by the broken lines of Figs. 2 and 4. In such position, the records are supported partly by the fingers 39b and partly by the members 52, and, at their forward edges, they are usually in contacting relation with the vertical surfaces 65a of the stripper members 65.

The first-stage feeding mechanism comprising the conveyer 39 and the second-stage feeding mechanism comprising the conveyer 50 are in substantially the positions illustrated in Figs. 2 and 4.

Immediately upon initiation of the cycle, crank arm A1 starts to move in a clockwise direction, Fig. 4, and, through the link 38, the first-stage conveyer 39 is moved from right to left, Fig. 4, until the fingers 39b are behind the stack of records which are now supported entirely by the members 52. The first-stage conveyer 39 takes its extreme position toward the left, Fig. 4, after the crank arm A1 has moved through an angle of approximately 80 degrees and, due to the lost motion slot at the end of lever 38, said first-stage conveyer 39 remains in the position last described for an interval of time.

While the crank arm A1 moves through an angle of approximately 80 degrees, as aforesaid, the second stage conveyer 50 remains inactive since, during this period, the pin at the end of extension 45 slides in the slot of link 46 toward the short leg of bell crank lever 47. Finally, however, the end of the aforesaid slot is reached and the bell crank lever 47 is swung in a clockwise direction, Fig. 4, to move the second-stage conveyer 50 rapidly from right to left, Fig. 4, such movement continuing until said conveyer 50 has taken its extreme position toward the left, Fig. 4, the crank arm A1 at this time having moved through an angle of approximately 140 degrees. The second-stage conveyer 50 temporarily remains in the position last described until the crank arm A1 has moved through an angle of approximately 255 degrees, the pin at the end of extension 45 meanwhile sliding in the slot of link 46 in a direction from the short leg of bell crank lever 47.

During initial movement of the second-stage conveyer 50, as aforesaid, the first-stage conveyer 39 remains stationary by virtue of the provision of the lost motion slot at the end of lever 38. However, after the crank arm A1 has moved through an angle of approximately 110 degrees, the first-stage conveyer 39 starts from left to right, Fig. 4, and almost immediately, the fingers 39b engage the lowermost record R of the stack of records and advance the same toward the turntable T, said record R being supported by and sliding on the members 52 and the sections 55a of members 55. The record thus being advanced passes beneath the stripper members 65, the springs 68 yielding to permit movement of the dogs 67 from the path of the record. At the same time, all or probably all records of the stack of records engage the vertical surface 65a of the stripper members 65 and are thereby prevented from passing toward the turntable T. Movement of the aforesaid record R under the control of the first-stage feeding mechanism continues until said record is supported solely by the sections 55a of members 55 and until the crank arm A1 has moved through an angle of approximately 260 degrees. Long prior to the position thus taken by the crank arm A1, the second-stage conveyer, as described above, has moved to and remains stationary in its extreme position toward the left, Fig. 4.

Just prior to the time that the first-stage conveyer 39 concludes its stroke toward the right, Fig. 4, as aforesaid, by a control suitably exercised as hereinafter described, the members 55 are swung in a counter-clockwise direction from the position shown in Fig. 3, the sections 55a of said members 55 passing downwardly through their slots in the members 58 and depositing the record thereon in the path of the ends of standards 50a of conveyer 50.

When the crank arm A1 has moved through an angle of approximately 255 degrees, movement of the second stage conveyer 50 from left to right, Fig. 4, is initiated at first slowly and then quite rapidly, the pin at the end of extension 45, at this time having reached that end of the slot in link 46 removed from the bell crank lever 47 to thereby rock the bell crank lever in a counter-clockwise direction, Fig. 4. As a result of the foregoing action, the ends of standards 50a pass the fingers 39b and the record, first supported by the members 58 and then by the members 59, is moved by said standards 50a into the path of the turntable T. When the angle through which the crank arm A1 has moved becomes approximately 320 degrees, movement of the second-stage conveyer 50 toward the turntable T ceases, said conveyer remaining in this position until another cycle of operation is initiated, the pin at the end of extension 45, at the time that crank arm A1 has moved through an angle of approximately 320 degrees, again starting its journey along the slot in the link 46 and toward that end thereof nearer the bell crank lever 47.

As the crank arm A1 passes through an angle of approximately 310 degrees, movement of the first-stage conveyer 39 from left to right is initiated and, as the cycle of operation ceases when the crank arm has passed through an angle of 360 degrees, movement of said first-stage conveyer 39 is discontinued until another cycle of operation is initiated.

*Removal of individual record R from the turntable T*

As illustrated in Figs. 3, 7 and 12, the aforesaid crank arm A1 comprises a plate-like member to which is secured, in non-movable relation with respect thereto, the cam K1 having formed therein a cam groove 69, Figs. 4 and 5. Coacting with the cam groove 69 is a cam follower 70 carried by one end of a lever 71 fulcrumed at 72a on the frame member F1 and spaced from the upper surface thereof. Pivoted to the other end of lever 71 is one end of a link 72, the other end of which is pivoted to one end of a lever 73 fulcrumed at 74 on one of the standards 60, Figs. 1, 3 and 10. Lever 73, at its other end, comprises a gear segment 73a meshing with a gear 75 keyed to a shaft 76 rotatable in a bearing in said last named standard 60.

As shown in Figs. 4 and 10, the standard 60, opposite said last named standard 60, has a journalled shaft 77 in alinement with the aforesaid shaft 76. Movable with the shafts 76 and 77 is a member or structure L utilizable for removing or lifting individual records R from the turntable T or from a position adjacent thereto, a line including said shafts 76 and 77 defining the axis about which member L oscillates substantially in the arc of a circle.

The non-operative position of the member L is illustrated in Figs. 1a, 2, 3 and 4 and is well below the plane of a record on the turntable T during a period of sound reproduction. In such position, the terminal portions 78 of member L depend substantially vertically from the shafts 76 and 77 to which they are respectively keyed or otherwise securely fixed. Disposed substantially at right angles to the terminal portions 78 are the respective lateral portions 79 joined by a U-shaped portion 80, the base of the U being curved on a radius somewhat greater than that of the turntable T. Each leg of the U-shaped portion 80, at its end, has a prong 81 formed preferably integrally therewith, said prongs 81, in part, overlying and being spaced from the respective legs of the U-shaped portion 80 and having their terminal portions 81a projecting laterally therefrom. The portions of each leg of the U-shaped portion 80 beneath each of the aforesaid prongs 81 comprises a sloping surface 82 to facilitate record discharge, as hereinafter described.

During a period of sound reproduction, the member L occupies substantially the position illustrated in Figs. 1a, 2, 3, and 4. Immediately after initiation of the cycle of operation, the turntable T descends as hereinafter described, depositing the thereby-carried record R on members 59. At this time, the sound box S is also swung from above said record R. Thereafter, and after the cam K1 has turned through an angle of approximately 30 degrees, the groove 69 of said cam K1 functions to swing the lever 73 in a clockwise direction, Figs. 1 and 3. As a result, the member L is swung in a counter-clockwise direction, Figs. 1 and 3, and the curved end of the U-shaped portion 80 engages and lifts the adjacent portion of the record from said members 59. During initial movement of the member L, the edge of the record adjacent the prongs 81 remains substantially stationary while the opposite edge thereof rises higher and higher. Eventually, under the influence of gravity, the record slides with respect to the member L, portions of said record passing beneath the prongs 81 and into the notches formed by said prongs and the adjacent portions of the U-shaped portion 80.

The record is now carried entirely by the member L and, during continued movement thereof in the direction of the arrow, Fig. 1, said record is bodily transported along a path simulating the arc of a circle from the vicinity of the turntable T toward the top of the stack of records. In so doing, the record is inverted or turned over; that is, the upper face of the record while on the turntable T becomes the lower face thereof when it is deposited on the stack of records.

After the record passes a vertical position while moving as described above, it still remains under the control of the member L since the prongs 81 and their extensions 81a now constitute the support for said record.

Eventually, as the member L and the thereby-supported record R continue moving in the direction indicated by the arrow, Fig. 1, the edge of the record most removed from the prongs 81 engages the top record of the stack of records. At about this time, or after the cam K1 has moved through an angle of approximately 110 degrees, the groove 69 of cam K1 starts to swing lever 73 in a counter-clockwise direction, Figs. 1 and 3. As a result, the direction of motion of member L is reversed and said member rapidly retraces its path until it again comes into the position illustrated in Figs. 1a, 2, 3 and 4, this occurring when the cam K1 has passed through an angle of approximately 140 degrees. For the remainder of the cycle, member L remains non-operative in the position just described.

After the edge of the record most removed from the prongs 81 engages the top record of the stack of records, as aforesaid, and during initial return movement of the member L, the edge of the record just transported by the member L, in two regions thereof, slides along the inclined faces 82 of said member L. In this manner, the record is discharged from the member L, spaced edge surfaces thereof adjacent the turntable T sliding downwardly along the inclined faces 65b of the stripper members 65, the record coming to rest on the top of the stack of records with that face uppermost which constituted the lowermost face while said record was on the turntable T. Accordingly, when the record which has just been discharged from the member L is next transported to the turntable T, sound will be reproduced from the face opposite to the face from which sound was earlier reproduced.

Referring to Figs. 1a and 4, it will be observed that the curved end portion of the member L is positioned closely adjacent the turntable T. Accordingly, said member L will engage and transport any record having a diameter slightly greater than that of the turntable T. The extensions 81a of the prongs 81 are symmetrically spaced with respect to the turntable T and are so positioned with respect to the turntable periphery that the periphery of the record of greatest diameter to be transported by the member L falls between said extensions 81a and the periphery of the turntable.

Under the conditions noted above, the member L satisfactorily transports records of different diameters, those of smaller diameter partaking of greater bodily movement before passing beneath the prongs 81 and their extensions 81a.

To produce even and regular movement of the member L as it oscillates, it may be desirable to resiliently control the same. To this end, there may be connected to the lever 71, through a pin-and-slot connection 83, Fig. 5, one end of a link or member 84, the other end of which is provided with a slot 84a for the reception of a pin 85 forming the tip of a standard 85a projecting above and carried by the frame member F1. Secured to the member 84 is one end of a helical spring 86, the other end of which is connected to a screw 87 adjustably mounted in the standard 85a, Fig. 3.

With the member L in its non-operative position, as illustrated in Fig. 3, the member 84 assumes the position shown in Fig. 5. During initial movement of the lever 71 in a clockwise direction, Fig. 5, and while member L is moving upwardly, the pin of the pin-and-slot connection 83 travels from right to left, Fig. 5. At about the time that member L starts to descend, the aforesaid pin reaches the end of its slot and, during continued descending movement of said member L, the link 84 is moved from right to left, Fig. 5, thereby placing the spring 86 under greater and greater tension. As a result, the movement of said member L is rendered even and regular, jerky motion being substantially eliminated.

*Cam and crank arm shaft clutch mechanism*

In accordance with one phase of my invention, it may be desirable to releasably couple the aforesaid crank arm A1 and cam K1 to the shaft 37. To this end and as shown in Fig. 12, the crank arm A1 and cam K1 are carried by a sleeve 88 freely rotatable on the shaft 37, said crank arm A1, cam K1 and the plate A2 being so fixed on the sleeve 88 as to be non-movable with respect thereto. As illustrated in Fig. 6, the plate A2 has pivoted thereto a clutch segment 89 biased in a clockwise direction, Figs. 6 and 12, by a helical spring 90, or equivalent. The clutch segment 89 comprises an angular end 89a, utilizable as hereinafter described, the plate A2 being cut away as shown in Fig. 6 to provide clearance for said angular end 89a. The clutch segment 89 also comprises a member or tooth 89b for coaction with a recess or slot in the clutch wheel A3 which is keyed or otherwise suitably fixed to the shaft 37 in non-movable relation with respect thereto, Fig. 12. In the example shown, the clutch wheel A3 comprises an elongated sleeve receiving, respectively, in suitable spaced relation the gear wheel 36 and cams K3, K4 and K5, said gear wheel and the last named cams thus being held in non-movable relation with respect to the clutch wheel A3 and shaft 37, the aforesaid elongated sleeve being journalled in the frame member F1.

As long as the spring 90 maintains the tooth 89b of clutch segment 89 in its coacting recess in the clutch wheel A3, the crank arm A1 and cam K1, in effect, are keyed to the shaft 37. However, upon detachment of said tooth 89b from its coacting recess, as hereinafter described, crank arm A1 and cam K1 are released from the shaft 37 in the sense that they are no longer operated thereby. As a result of such detachment of the tooth 89b, the first and second stage record conveyers are rendered non-operative as is the record transporting member L.

*Control mechanism for the main clutch mechanism*

The cam K2 is carried by the gear wheel 36 by which, as described above, rotary motion is imparted to the shaft 37. This action is effected because the gear wheel 36, in effect, is keyed to the shaft 37 through the elongated sleeve of clutch wheel A3.

Cam K2 is shaped substantially as an annulus, the inner and outer surfaces thereof comprising cam grooves, each of which has a notch formed therein. Coacting with the inner surface of cam K2 is a lateral extension 32d of the aforesaid V-shaped lever 32, Figs. 6 and 7, said lateral extension 32d coacting with the notch or recess in said inner surface of cam K2 when the automatic mechanism is out of cycle.

Coacting with the outer surface of cam K2 is one end of one leg of a three-legged lever 91, Figs. 5 and 7, pivoted to the frame member F1 and spaced from the upper surface thereof, said lever 91 being biased in a clockwise direction, Figs. 5, 6 and 7, by a helical spring 92, or equivalent. One end of another leg of lever 91 has secured thereto a lateral member 93 coacting with a sloping surface on the edge of the clutch plate 6 when the automatic mechanism is out of cycle. One end of the remaining leg of lever 91 has pivoted thereto one end of a link 94, the other end of which is pivoted to an extension 27a of the lever 27.

When the cycle of the automatic mechanism is initiated by movement of lever 32 in a counter-clockwise direction, Figs. 5, 6 and 7, the aforesaid lateral extension 32d of said lever 32 is removed from the notch or recess in the inner surface of cam K2. As soon as the cycle is started, movement of gear 36 in the direction of the arrow, Fig. 7, is initiated. Cam K2 is similarly moved and consequently, the lever 32, by coaction of its lateral extension 32d with the inner regular surface of cam K2, is so controlled that its nose 32b is held out of the path of the rotating clutch segment 9. After the cam K2 has moved through nearly 360 degrees, the notch in its inner surface again comes into registering relation with the lateral extension of lever 32 whereupon the latter swings in a clockwise direction, Figs. 5, 6 and 7, the nose 32b thereof moving into the path of one end of the clutch crescent 9 which thereupon is swung in a counter-clockwise direction, Figs. 6 and 7, to release its tooth 9a from clutch wheel 10 just as the cam K2 has moved through 360 degrees. Lever 32 is free to move clockwise at this time as just described because the pawl 24 has meanwhile been moved from coacting relation with the rack member 26. In this manner, the cycle of operation of the automatic mechanism is concluded.

When the cycle of the automatic mechanism is initiated, movement of cam K2 in a clockwise direction, Figs. 5, 6 and 7, effects counter-clockwise movement of lever 91, Figs. 5, 6 and 7. As a result, the lateral member 93 of lever 91 is moved out of the path of the sloping surface of clutch plate 6 and is so held during rotation of said clutch plate 6 and during operation of the automatic mechanism. After the cam K2 has rotated through nearly 360 degrees, the notch in its outer surface comes into registering relation with the adjacent end of lever 91 and the latter, under the influence of spring 92, swings in a clockwise direction, Fig. 7, to thereby move the lateral extension 93 into the path of the sloping surface of clutch plate 6. As the cycle of operation ceases, said sloping surface engages the lateral extension 93 to thereby positively prevent movement of clutch plate 6 until another cycle is initiated. In this manner, chattering engagement is prevented of the tooth 9a of clutch crescent 9 with adjacent teeth of the clutch spider 10, this action occurring under the influence of the flexed spring 8 were the lateral member or extension 93, or equivalent, not provided.

When the cycle of the automatic mechanism is initiated by coaction of the pawl 24 with rack member 26, said pawl 24, afterwards, under the control of its supporting tone arm 16 is swung, as hereinafter described, in a counter-clockwise direction, Fig. 1a. In accordance with my invention, the rack 26 is removed from the path of pawl 24 while the latter moves as just described to thereby eliminate the noise which would otherwise occur were the rack 26 not thus shifted. To this end, the connection comprising the link 94 between the levers 27 and 91 is provided, the lever 91 as it swings counter-clockwise, Fig. 7, when the cycle is initiated, moving the lever 27 in a clockwise direction, Fig. 7, through the link 94, to shift the rack member 26 from the path of pawl 24.

Turntable elevating mechanism

Coacting with the cam K3 is a cam follower 95 carried by one end of a lever 96 pivoted at 97 to the frame member F1 and suitably spaced from the lower surface thereof, Figs. 2 and 14. To the other end of lever 96 is pivoted one end of a link 98, the other end of which is pivoted to one end of a lever 99 extending upwardly through a slot or passage 100 in the frame member F1 and biased in a clockwise direction, Fig. 2, by a helical spring 101, or equivalent. The other end of lever 99 is keyed, or otherwise suitably fixed in non-movable relation, to a shaft or rod 102 journaled in alined ears or projections 53b depending from the aforesaid member f, Figs. 3 and 5.

Keyed, or otherwise suitably fixed in non-movable relation, to the shaft 102 is one end of a member or lever 103, Figs. 2, 2a, 3, 4 and 5, the other end of which is bifurcated, the bifurcations having lugs or flanges 103a contacting with the lower surface of a collar 104 rotatably mounted through interposed anti-friction members 105, on a second collar 106 keyed, or otherwise suitably fixed in non-movable relation, to a sleeve 107 supporting and having the aforesaid turntable T rotatable therewith, said sleeve 107 comprising a rounded tip 107a projecting above the plane of the turntable and utilizable for record-centering and -retaining purposes as well understood in the art. The main drive shaft 4, at its upper end, Fig. 2a, comprises a portion of reduced diameter axially of which, the aforesaid sleeve 107 is freely slidable. Sleeve 107, however, comprises a slot 107b extending longitudinally thereof for the reception of a pin 108 by virtue of which said sleeve 107 rotates with the shaft 4 though being freely slidable longitudinally thereof.

As the cycle of the automatic mechanism is initiated, cam K3 starts to move in a clockwise direction, Fig. 14, and descent of the turntable T and the thereby-carried record R is immediately started. Downward movement of sound box S and its stylus s is slight due to the fact that the stop member 18b, Fig. 1b, moves into engagement with the stop member 18a.

As the turntable T descends, lever 103 swings in a counter-clockwise direction, Figs. 2, 2a and 3; the lever 99 is similarly swung, Figs. 2 and 3, expanding the spring 101 and, through the link 98, swinging the lever 96 in a clockwise direction, Fig. 14. Cam K3 as it rotates clockwise, as aforesaid, permits such movement of the lever 96.

Eventually, as the turntable T descends, the lower surface of the thereby-carried record R engages the members 59 which support said record R until it is engaged by the transporting member L. The turntable T, however, continues descending until the cam K3 has turned through an angle of approximately 20 degrees after which said turntable T remains in its lowermost position until the cam K3 has turned through an angle of approximately 310 degrees.

While the turntable T remains in the position last described, the member L removes that record from the members 59 from which sound has just been reproduced and the first-stage and second-stage feeding mechanisms transport the record from which sound is next to be reproduced on to said members 59 directly above the turntable T.

After the cam K3 has moved through approximately 310 degrees, it becomes effective to swing the lever 96 in a counter-clockwise direction, Fig. 14, and, through the connecting mechanism, to elevate the turntable T, the spring 101 assisting this action. As the turntable T passes upwardly, the tip 107a projecting thereabove enters the centrally-disposed perforation on the record, the upper surface of said turntable immediately thereafter engaging the lower surface of the record to remove the same from the members 59, said record, now rotating with the turntable, being carried without pause to the position in which it rotates while sound is being reproduced. In so doing, the stylus s of sound box S is engaged and the sound box slightly elevated, the stop member 18b, Fig. 1b, moving from the stop member 18a. At this time, the cam K3 has moved through an angle of approximately 350 degrees.

Pivoted to the shaft 102 and freely oscillatory thereon is a lever 109, Figs. 2 and 5, biased, by a helical spring 110, or equivalent, depending from the member 53, in a counter-clockwise direction, Fig. 2, to a degree dependent upon the position of a member 111, Figs. 2 and 4, adjustably carried by the lever 103 and coacting with an extension 109a of lever 109. At its end removed from extension 109a, lever 109 comprises a plane, horizontal section 109b with which is adapted to coact the end of a rod or member 112 carried by the tone arm 16 and freely adjustable toward and from the same upon manipulation of a nut 113. The end of rod 112 adjacent the section 109b of lever 109 preferably comprises a tip of yielding material, as leather, for direct engagement with said section 109b.

During a period of sound reproduction or while the tone arm 16 and sound box S are moving in a clockwise direction, Figs. 1a and 4, across the face of a record, the parts described immediately above occupy substantially the position shown in Figs. 2 and 9, that is, one wherein the section 109b of lever 109 is disengaged from the end of rod 112.

Upon initiation of the cycle of automatic operation, lever 103 swings in a counter-clockwise direction, Fig. 2, to similarly move the stop member 111. As a result, spring 110 swings lever 109 in a counter-clockwise direction, Fig. 2, and the section 109b of lever 109 engages the lower end of rod 112. Accordingly, movement of the tone arm 16 and associated parts including the rod 112, is frictionally impeded as they are swung in a counter-clockwise direction, Figs. 1a and 4, as hereinafter described. In this manner, the parts last named are caused to move in an even and regular manner.

The section 109b of lever 109 remains in engagement with the lower end of rod 112 until late in the cycle when the turntable T is being elevated and while the lever 103 is approaching the position illustrated in Fig. 2. Prior to this time, the tone arm 16 and sound box S have been automatically moved in a clockwise direction, Fig. 4, to position the sound box stylus for later coaction with the spiral sound reproducing groove on that record from which sound is next to be reproduced.

*Automatically controlled movement of the tone arm*

Referring to Figs. 3 and 14, there is illustrated a lever 114 spaced below the frame member F1 and pivoted thereto. One end of the lever 114 has a cam follower which coacts with the cam K4 and which is biased into engagement therewith by a helical spring 115, or equivalent, tending to swing the lever 114 in a clockwise direction, Fig. 14. Pivoted to the other end of lever 114 is one end of a link 116, the other end of which is pivoted to one end of a lever 117 spaced below the frame member F1 and carried by a shaft or member 118, Figs. 3, 5, 7 and 14, journaled in said frame member F1, above which, said shaft 118 carries another lever 119.

Above the plane of the section 109b of lever 109, Figs. 7 and 9, lever 119 comprises a substantially horizontal section 119a from which extends a curved portion 119b adapted, as hereinafter described, to coact with the member 112 which depends from the tone arm 16. Spaced above the aforesaid section 119a of lever 119 is a lever 120 pivoted thereto at 121, said lever 120 being suitably biased in a clockwise direction, Figs. 7 and 14, as by a helical spring 122 connected thereto and to a lug 119c upstanding from the section 119a of lever 119, clockwise movement, as aforesaid, of lever 120 being suitably limited, as by a screw 123 coacting therewith and adjustably mounted in the lug 119c.

Spaced below one end of lever 120 is a lever 124, Figs. 7, 8, 9 and 14, pivoted thereto at 125 and being suitably biased in a counter-clockwise direction, Figs. 7, 8 and 14, as by a helical spring 126 connected at its ends to the respective lugs or ears upstanding from the respective levers 120 and 124, counter-clockwise movement, as aforesaid, of lever 124 being suitably limited, as by a screw 127 adjustably carried thereby and coacting with the lever 120. Carried by lever 124 is a member 128, preferably a leaf spring, and adapted, as hereinafter described, to coact with the rod 112 carried by the tone arm 16. Lever 124 also carries or comprises an inclined member 129 with which, at times, coacts the section 109b of lever 109, as hereinafter described.

Disposed in alined ears 53c depending from the plate f is a shaft 130 to which is pivoted a member or lever 131 suitably biased in a counter-clockwise direction, Fig. 3, as by a helical spring 132 connected at its ends, respectively, to the plate f and lever 131, counter-clockwise movement, as aforesaid, of lever 131 being suitably limited as by a screw adjustably carried thereby and coacting with a part of the plate f. As illustrated in Fig. 3, lever 131 comprises spaced horizontal arms from which respectively extend the spaced, parallel vertical arms 131a, each of which passes through the frame member F and motor board m and terminates in an inclined finger 131b with which individual records of the proper diameter are adapted to coact, as hereinafter described. Lever 131 also comprises an extension 131c utilizable for controlling movement of the aforesaid lever 120.

Upon initiation of the cycle of the automatic mechanism, cam K4 starts to move in a clockwise direction, Fig. 14. As a result, lever 114 is swung counter-clockwise, Fig. 14, the motion thereof, through the described mechanism, producing clockwise movement, Figs. 5, 7, 8 and 14, of lever 119, the curved portion 119b of the latter approaching and, after the turntable T with the thereby-carried record R has started to descend, contacting with the rod 112 depending from the tone arm 16, to move the latter in such direction that the sound box S moves laterally from a point above the center of said last named record R. Upon completion of this movement, the stylus s of the sound box S is vertically above a point without the periphery of said last named record R and the cam K4 has moved through an angle of approximately 35 degrees. In the meantime, said last named record R has been deposited on the members 59 to be later removed therefrom by the member L.

As the turntable T descends, as hereinbefore described, spring 110 becomes effective to swing lever 109 counter-clockwise, Fig. 2, and the part 109b of said lever 109 is yieldingly moved into engagement with the lower end of rod 112. As a result, a braking effect is applied to the tone arm as it is moved laterally from a point above the center of said last named record R.

Under the yielding influence of the lever 109 and with the curved portion 119b of lever 119 engaging rod 112, the tone arm 16 and sound box S remain in the position to which moved, as just described, until the cam K4 has moved through an angle of approximately 290 degrees, at which time, lever 114 starts to move in a clockwise direction, Fig. 14, accompanied by counter-clockwise movement of lever 119, Fig. 14. As a result, lever 120 and member 128 both approach and eventually engage the rod 112 to move the same and the tone arm 16 in a clockwise direction, Fig. 4, or laterally toward a point above the center of the turntable T. This movement continues until the cam K4 has moved through an angle of approximately 320 degrees, at which time the stylus s of the sound box S coincides with a line which may be assumed as extending vertically from a record R between the outer edge thereof and the outer edge of the spiral sound-reproducing groove, after delivery of said last named record above the turntable T has been effected by the second-stage feeding mechanism. During lateral movement of the sound box S toward a point above the turntable T, as last described the section 109b of lever 109 remains in engagement with the end of rod 112.

The sound box S remains in the position last described while the turntable T is rising, first, without said last named record R from which sound is next to be reproduced and which is now supported by the members 59 and, thereafter, while carrying said last named record R upwardly from said members 59. Eventually said record R, as it moves upwardly and at the point from which the aforesaid vertical line extends, engages the stylus s of the sound box S, the latter being slightly elevated, the goose neck 17 pivoting on the tone arm 16 to permit such elevating action and the stop member 18b, Fig. 1b, moving from the stop member 18a.

Immediately after said last named record R engages the stylus s as just described, the lever 109 is swung clockwise, Fig. 2, by lever 103 and screw 111, the section 109b of said lever 109 moving downwardly from the end of rod 112. Section 109b, in thus moving downwardly, engages the inclined member 129, Figs. 9 and 13, to move lever 124 clockwise, Fig. 8, whereby the member 128 gently so moves the rod 112 and tone arm 16 that the sound box S approaches somewhat nearer a position above the turntable center and, as a result, the sound box stylus s is fed into the spiral sound reproducing groove on said last named record R which is now rotating with the turntable T.

At this time, cam K4 has moved through an angle of nearly 360 degrees. However, just before movement of said cam K4 ceases for the cycle, the small raised portion in the cam groove near the "low" surface slightly rocks lever 114 in a counter-clockwise direction, Fig. 14, to produce clockwise movement, Figs. 5, 7, 8 and 14, of lever 119, whereby the member 128 is moved slightly from the rod 112. Member 128, when actuated in the manner described above exercises only momentary control on the tone arm 16 and, as a result, almost immediately after the sound box stylus s engages the record spiral sound reproducing groove, as aforesaid, movement of said sound box comes under the sole control of said spiral groove.

In the foregoing description of the operation of the tone arm movement, it was assumed that no control was exercised by the lever 131. As hereinbefore stated, my invention involves mechanism for reproducing sound from records of different diameters without necessitating manual control and, in the form of my invention herein illustrated, records having a diameter of ten inches or those having a diameter of twelve inches may be utilized for the reproduction of sound.

Assume, for example, that a record having a diameter of twelve inches is being advanced from left to right, Fig. 1a, by the second-stage feeding mechanism. As the stroke of the latter is concluded, said last named record comes to rest on the members 59, the advanced edge thereof engaging the inclined fingers 131b of lever 131 to thereby rock the latter in a clockwise direction, Fig. 3, expanding spring 132, and removing the extension 131c of said lever 131 out of the path of lever 120. Accordingly, during movement of the lever 119 to laterally advance the sound box S toward a point above the center of the turn table, as hereinbefore described, the position of lever 120 with respect to lever 119 is governed solely by the screw 123, and the lever 124 together with member 128 occupy positions relative to said lever 119 as indicated, for example, in Fig. 8. Under the conditions recited, the sound box S is moved to such position that the sound box stylus s will coincide with a line which may be assumed as extending vertically from said last named record between the outer edge thereof and the outer edge of the spiral sound reproducing groove, after delivery of said last named record above the turntable T has been effected.

Extension 131c of lever 131 is temporarily held out of the path of lever 120 by said last named record R as it remains temporarily stationary on the member 59. While said last named record R thus remains stationary, the lever 119 partakes of counter-clockwise movement, as aforesaid, and the lever 120 moves above the end of extension 131c. After said last named record R is moved upwardly by the turntable T and from the inclined fingers 131b of lever 131, the extension 131c engages the lever 120, now positioned thereabove, to thereby retain lever 131 in substantially its depressed position. This relation of the parts continues as the automatic mechanism goes out of cycle, during the period of sound reproduction, and during that part of the next cycle of the automatic mechanism which elapses before the lever 119 has been swung to sufficient extent in a clockwise direction, Figs. 5, 7, 8 and 14, to remove the lever 120 from above the extension 131c of lever 131. At this time, the lever 131, under the influence of the spring 132, moves counter-clockwise, Fig. 3, and the inclined fingers 131b of lever 131 are again disposed in the path of any succeeding record having a diameter of twelve inches which is transported on to the members 59.

When a record having a diameter less than twelve inches, for example, ten inches, is transported onto the members 59 and above the turntable T, the advanced edge thereof stops short of the inclined surface 131b of lever 131. Accordingly, said lever 131 is not actuated and when the lever 119 is laterally swung to advance the sound box S toward a point above the center of the turntable T, as hereinbefore described, the free end of lever 120 engages the extension 131c of lever 131 to thereby swing said lever 120 counter-clockwise, Figs. 5, 7, 8 and 14, with respect to its carrying lever 119. In so doing, lever 120 recedes from the screw 123 and the spring 122 is tensioned.

As a result of the foregoing action, at the end of the stroke of the lever 119 in a counter-clockwise direction, Fig. 14, the member 128 and the rod 112 occupy positions nearer the end of the curved extension 119b of lever 119 than they occupied when the extension 131c of lever 131 was out of the path of the free end of lever 120. Accordingly, the sound box S is swung nearer a position above the center of the turntable T and, with correct proportioning of the parts, the stylus s of the sound box S coincides with a line which may be assumed as extending vertically from the record of smaller diameter between the outer edge thereof and the outer edge of the spiral sound reproducing groove, after delivery of said record of smaller diameter above the turntable T has been effected.

*Mechanism for controlling the passage of individual records R from the region into which delivered by the first-stage feeding mechanism and for controlling members toward which individual records R are passed by the member L.*

Referring to Figs. 2, 3, 14 and 16, one end of a lever 134 comprises a cam follower coacting with the cam K5, said lever being spaced from the lower surface of frame member F1 and pivoted thereto at 135. Lever 134 comprises a laterally extending lug slotted for the reception of one end of a link 136, the other end of which is pivoted to the aforesaid lever 56.

Pivoted to the end of lever 134 removed from its cam follower is one end of a link 137, the other end of which is pivoted to one end of an arm or member 138 keyed, or otherwise fixed, to a shaft 139 rotatably mounted in transversely alined brackets 140 depending from the frame member F, Figs. 10 and 11. Keyed, or otherwise fixed, to the shaft 139 are the spaced arms or levers 141, each of which, as indicated in Fig. 2, comprises an inclined portion terminating in an angular portion on the end of which is disposed a tip or pad 142 preferably of resilient material, as soft rubber. As illustrated in Fig. 11, each of the levers 141 are similarly spaced from opposite sides of the first-stage record transporting conveyer, the angular portions thereof extending, respectively, through slots in the frame member F, the motor-board m, and the members 58 resting on said motor-board m. As shown in Figs. 2, 10 and 11, a helical spring 143, or equivalent, may have its ends connected, respectively, to one of the brackets 140 and to the adjacent lever 141 whereby both of said levers are biased in a counter-clockwise direction, Fig. 2.

As the cycle of the automatic mechanism is initiated, cam K5 starts to move in a clockwise-direction, Fig. 16. After said cam K5 has rotated through an angle of approximately 80 degrees, the follower of lever 134 progressively comes into coincidence with the low portion thereof and said lever 134 is abruptly swung, under the influence of spring 143, in a counter-clockwise direction, Fig. 14. As a result, through the intervening mechanism, levers 141 are swung in a counter-clockwise direction, Fig. 2, and, if there are no records in the place normally occupied by the stack of records, the pads 142 carried by the respective levers 141 assume and temporarily retain a position a suitable distance, as an inch, more or less, above the supporting members 52.

As hereinbefore stated, the member L removes a record from the vicinity of the turntable T, swings it through substantially an arc, and then retraces its path. The record is discharged from the member L as it starts to retrace its path, as aforesaid, and, as said record slides down the inclined surfaces 65b of members 65, the lower surface thereof engages the elevated cushion pads 142. Cam K5 thereafter functions to swing levers 141 in a clockwise direction, Fig. 2, tensioning spring 143, and the record is lowered onto the supporting members 52, the cushion pads 142 thereafter moving below the lower surface of the record. The latter occurs when the cam K5 has moved through an angle of approximately 115 degrees.

As the operation was described above, the levers 141 serve to cushion and check descent of a record as and after it is discharged from the member L. In so doing, the attendant noise incident to the otherwise direct deposit of a record on the members 52, or equivalent, is largely eliminated.

As hereinbefore stated, the arrangement is such that the spring 143 elevates the levers 141 and the pads 142 carried thereby, the motive device M through cam K5 expanding said spring and returning the levers 141 in a clockwise direction, Fig. 2. To the end that the load on the motive device M may be kept within proper limits, it is necessary to so design the spring 143 that an undue force is not required for expanding it. Within the limits thus imposed, the spring 143 is effective to swing the levers 141 counter-clockwise, Fig. 2, and elevate the pads 142 only when none or no more than a small number of records, as three or four, are comprised in the stack of records. When the stack is formed of a number of records greater than the number recited the levers 141 and their pads 142 are not elevated as described above. This condition is not particularly disadvantageous because with a reasonably large number of records in the stack, the distance through which a record passes upon discharge thereof from the member L is not large. Moreover, noise is greatly decreased when the record being discharged from the member L is passed onto the top surface of a record and not directly on to the members 52.

Due to the provision of the slotted lug in lever 134, link 136 remains stationary while said lever 134 moves counterclockwise and then clockwise as aforesaid, the lower horizontal sections of the members 55 engaging the lower surfaces of the frame member F at this time. As the cam K5 continues moving and after it has passed through an angle of approximately 240 degrees, the raised portion thereof comes into engagement with the follower of lever 134 to swing the latter in a clockwise direction, Fig. 14. As a result, through the link 136, the lever 56 is swung clockwise, Fig. 3 and the sections 55a of members 55 are moved downwardly, Figs. 3 and 10. As the first-stage conveyer 39 concludes its stroke toward the turntable to transport a record onto said sections 55a and as the rear edge of said record passes beyond the ends of members 52 nearer the turntable, said sections 55a have been depressed into substantially the plane of the upper surfaces of members 58 to thereby lower the record almost entirely into engagement with said upper surfaces of members 58. Just after the aforesaid rear edge of the record is moved below the aforesaid ends of members 52, the sections 55a become fully depressed and the record is supported entirely by the members 58. The record is now in the path of the upper ends of members 50a of the second-stage conveyer which immediately thereafter is moved to transport the record toward the turntable. Due to the arrangement of the parts, the speed of the record when under the control of the second-stage feeding mechanism comprising the conveyor 50 is much higher than when said record is under the control of the first-stage feeding mechanism comprising the conveyor 39.

Cam K5 maintains the sections 55a fully depressed, as aforesaid, until it has rotated through an angle of approximately 310 degrees. At this time, the record has been moved from said sections 55a and they are now elevated into their upper position where they remain stationary until the next record is transported thereonto by the first-stage conveyer 39.

Speed controlling mechanism for the motive device

Journalled in bearings 144 carried by the frame of the motor M is a shaft 145, Figs. 2 and 17, having mounted for rotative movement therewith a worm gear 146 meshing with a gear wheel 147 carried by and rotatable with the motor shaft 4. Slidable on the shaft 145 is a sleeve 146' terminating at one end in an enlarged collar 146a to which a disk or plate 147a is suitably secured for rotative and slidable movement therewith. Keyed or otherwise non-rotatably and non-slidably fixed to the end of shaft 145 removed from disk 147a is a second sleeve 148 terminating in an enlarged collar 148a corresponding with the collar 146a. Suitably secured in spaced relation to the collars 146a and 148a are a plurality of leaf springs 149 each carrying an inertia member or weight 150 intermediate its ends.

Coacting with the disk 147a is a member 151, preferably a leather pad, which is carried by one end of a bell crank lever 152 pivoted at 153 to the frame of motor M which also carries a bracket 154 having adjustably mounted therein a screw 155 coacting with a lug 152a formed on lever 152, a helical spring 156, or equivalent, biasing lever 152 in a clockwise direction, Fig. 17, into engagement at its lug 152a with screw 155. Lever 152, at its end removed from member 151 has a cam follower coacting with the cam K6.

During a period of sound reproduction or while the automatic mechanism is out of cycle, the cam follower of lever 152 is in coincidence with the low area of cam K6. At this time, the disk 147a occupies a position such that the shaft 4 of the motor M rotates at normal speed, usually, 78 R. P. M. Such normal operating speed may be varied by adjustment of the screw 155.

As the cycle of the automatic mechanism is initiated, cam K6 starts to move in a clockwise direction, Fig. 17, and almost immediately the high area thereof engages the cam follower of lever 152 thereby swinging the latter in a counter-clockwise direction, Fig. 17, and moving the member 151 carried thereby to a new position spaced from the disk 147a. As a result, the rotative speeds of the shafts 4 and 145 are increased and the springs 149 expand under the influence of centrifugal action. Consequently, the rotating sleeve 146 and collar 146a move to the left, Fig. 17, until the disk 147a comes into engagement with the member 151 in the new position of the latter, the increased rotative speeds of the shafts 4 and 145 thereby becoming stabilized.

In the example shown, the aforesaid shafts thus rotate at increased speed throughout substantially the entire cycle or until the cam K6, after it has moved through nearly 360 degrees, permits clockwise movement of member 152 under the influence of spring 156. By virtue of such clockwise movement, disk 147a is restored to that position which it occupies during a period of sound reproduction and the speed of the motor shaft 4 is correspondingly decreased.

An arrangement of the character described above is desirable in that the cycle of the automatic mechanism is shortened while, at the same time, more power is obtained for effecting the various controls.

Electric switch mechanism

Supported on the upper surface of the member f is a switch comprising members 157 of insulating material, Figs. 6 and 7, suitably maintained in spaced relation to form a housing for terminal members 158 spaced from each other by a block 159 of insulating material, Fig. 6, and connected, respectively, to conductors 160, Fig. 7, included in the circuit of the coil structure of the motor M. The terminal members 158 comprise or have associated respectively therewith the resilient contact members 158a, each of which comprises a contact tip 158b, Fig. 6.

Coacting with an extension of one of the contact members 158a is a lever or dog 161 having an actuating extension 161a and another extension 161b limiting counter-clockwise movement thereof, Fig. 6. When the contact tips 158b are separated, the circuit through the conductors 160 is opened and operation of the motor M is discontinued.

Manual control of electric switch mechanism

As illustrated in Figs. 5, 6 and 7, there is pivoted to the member f1 and spaced above its upper surface a lever 162 extending, at its free end, Fig. 1, through a slot 163 formed in a panel 164 mounted on the front wall of casing C, said lever 162 comprising an actuating knob 162a disposed exteriorly of the casing. Pivoted to the lever 162 is one end of a link 165, the other end of which is pivoted to a lever 166 pivoted at 167 to a cam 168 spaced above the upper surface of member f1 and oscillatorily mounted on a pin or member 169 projecting therefrom.

Lever 166 is biased in a counter-clockwise direction, Figs. 5, 6 and 7, by a helical spring 170, or equivalent, one end of which is connected to a pin or member 166a projecting therefrom and the other end of which is connected to a pin or member 171 carried by and upstanding from the member f1. Lever 166 comprises a depending lug or member 166b and a raised surface 166c, Fig. 7, both utilizable as hereinafter described; lever 166 also comprises an extension 166d.

Cam 168 comprises a lug or extension 168a coacting with the lever 166 and with a pin or member 172 carried by and upstanding from the member f1. Cam 168 also comprises a projection or nib 168b forming a stop member for a cam follower 173a carried by one leg of a lever 173 pivoted on the aforesaid pin 33 and spaced above the lever 32, said cam follower 173a being biased into engagement with the cam surface of cam 168 by a helical spring 174, or equivalent, one end of which is connected to the aforesaid pin or member 171 and the other end of which is connected to a lug or member 173b comprised in lever 173 which is thus biased in a clockwise direction, Figs. 5, 6 and 7.

Another leg of lever 173 comprises a depending lug or flange 173c and still another leg of said lever 173 comprises a depending lug or flange 173d, said flanges 173c and 173d being utilizable as hereinafter described. The remaining leg of lever 173 comprises a nose 173e for actuating the aforesaid dog 161.

With the parts in the position illustrated in Figs. 5, 6 and 7, the extension 166d of lever 166 is in direct engagement with the end of that leg of lever 173 which carries cam follower 173a. As a result, spring 170 is ineffective to move lever 166. At this time, the switch contacts 158b are closed and the motor M is in operation.

If the lever 162 is now swung, as by a manual act, in a counter-clockwise direction, Figs. 5, 6 and 7, the lever 166 is similarly moved on its pivot pin 167 and relative to the cam 168 until the extension 166d is disengaged from the end of the adjacent leg of lever 173. Spring 170 immediately becomes active and the cam 168 is moved counter-clockwise, Figs. 5, 6 and 7, about its pivot pin 169, its lug 168a coming into contact with the adjacent inner curved surface of lever 166, said surface last mentioned having been moved from the lug 168a when the lever 162 was manually actuated, as aforesaid. Counter-clockwise movement, as aforesaid, of cam 168 continues, under the influence of spring 170, until the raised surface 166c of lever 166 engages a portion of the lever 165. During such counter-clockwise movement of cam 168, the lever 173 is swung in a counter-clockwise direction, Figs. 5, 6 and 7, expanding the spring 174 and causing the nose 173e of said lever 173 to actuate the dog 161 to open the switch contacts 158b.

With the parts in the position last described, the switch contacts 158b are closed to initiate operation of the motor M by manually or otherwise swinging the lever 162 to move the lever 166 toward the position illustrated in Figs. 5, 6 and 7. In so doing, the spring 170 is expanded, the cam 168 is moved clockwise, Figs. 5, 6 and 7, toward the position illustrated and the extension 166d of lever 166 is moved behind the end of the adjacent leg of lever 173, the parts last mentioned being held in contacting relation by the spring 170. Any further movement of the cam 168 in a clockwise direction, Figs. 5, 6 and 7, and from the position illustrated is prevented by engagement of the lug 168a of cam 168 with the member 172. When the cam 168 was moved as last described, the lever 173 moved clockwise, Figs. 5, 6 and 7, under the influence of spring 174 to permit retraction of the dog 161 and to allow the resilient contact members 158a to move toward each other and engage at the switch contacts 158b.

*Selective control mechanism*

In the form of my invention herein illustrated, the plate f1, adjacent the panel 164 comprises a plurality of spaced upstanding lugs or flanges 175, 176, 177 and 178, each of which carries a transverse pin or member supporting, for oscillatory movement, the respective actuating members or levers 179, 180, 181 and 182 each having a finger extension projecting through the separate slots of panel 164 to thus be accessible from the exterior of the cabinet C.

The actuating members 179, 180 and 182 are so controlled that they will remain in either of two positions to which moved, that is, with their finger extensions either elevated or depressed. To this end, upstanding lugs or members 183 are formed on the plate f1 to the rear of the respective flanges 175, 176 and 178. Each of the lugs or members 183 is connected to a pin projecting laterally from each actuating member 179, 180 and 182 by a helical spring 184. In each case, the arrangement is such that, with an actuating member in substantially its mid-position, that part of the lug to which the spring is secured, the transverse support for the actuating member, and the pin projecting laterally therefrom are substantially in straight-line relation. Obviously, when the finger extension of any one of the actuating members 179, 180 or 182 are either elevated or depressed, such straight-line relation is altered, the aforesaid lateral pin moving thereabove or therebelow as the case may be. With arrangements of this character, the respective springs 184 operate to maintain the finger extensions of the actuating members 179, 180 and 182 either in elevated or depressed position.

The actuating member 181 is so controlled that its finger extension remains in a depressed position and constantly tends to return to that position when removed therefrom. To this end, the plate f1 forwardly of the flange 177 comprises a lug or extension 185 having one end of a helical spring 186 connected thereto, the other end of said spring 186 being connected to a pin projecting laterally from the actuating member 181. As a result, under the influence of spring 186, the finger extension of actuating member 181 remains in a depressed position.

In the form of my invention herein illustrated, if the finger extension of actuating member 182 is elevated, the automatic mechanism operates automatically, as hereinbefore described, to reproduce sound from a plurality of records in succession. However, if the finger extension of actuating member 182 is depressed, a control is effected whereby substantially the entire chain of automatic mechanism is placed in a non-operative condition.

To this end and as illustrated in Figs. 5, 6, 7 and 18, the actuating member 182, spaced from its transverse supporting pin, may have pivoted thereto one end of a member or link 187 which is slidably mounted in a lug or flange 188 upstanding from the plate f1 and terminating in an angular extension 187a adapted to coact with the aforesaid lever 30.

By elevating the finger extension of actuating member 182, the end 187a of link 187 engages the lever 30 and swings the same in a counter-clockwise direction, Figs. 5, 6 and 7, on its supporting lever 29 and expanding the helical spring 31 until said lever 30 engages a stop lug 29d of lever 29. In so doing and as well illustrated in Fig. 6, the end of lever 30 removed from the end 187a of link 187 is so positioned that it will engage the lug 32a of lever 32 when the lever 29 is moved clockwise, Fig. 6, in response to the control effected by the record eccentric groove e on the sound box stylus s. As hereinbefore described, when the lug 32a is engaged, as aforesaid, lever 32 is moved counter-clockwise, Fig. 6, to permit engagement of the clutch segment 9 with the clutch wheel 10 at the clutch segment tooth 9a whereby a cycle of operation of the automatic mechanism is initiated. Accordingly, with the finger extension of the actuating member 182 in elevated position, the end 187a of link 187 engages the lever 30 and periods of sound reproduction are alternated with periods during which the automatic mechanism is in cycle.

By depressing the finger extension of the actuating member 182, the end 187a of link 187 is removed from the lever 30 and the latter swings in a clockwise direction, Fig. 6, under the influence of the spring 31 until engagement is effected with the stop lug 29e of lever 29. In so doing, the end of lever 30 removed from the end 187a of link 187 is so positioned that it will coact with the flange 173c of lever 173 and not with the flange 32a of lever 32. Accordingly, as a period of sound reproduction is concluded and after the stylus s of the sound box S engages the record eccentric groove e, the lever 29 is moved clockwise, Fig. 6, and the flange 173c of lever 173 is engaged to produce counter-clockwise movement, Fig. 6, of lever 173 whereby the switch contacts 158b are opened and the lever 162 is swung counter-clockwise, Figs. 5, 6 and 7, in response to disengagement of the extension 166d of lever 166 from the adjacent leg of lever 173. As a result, operation of the motor M is discontinued. The sound box S may now manually be removed from the record on the turntable T, said record may be manually removed from the turntable T, another record manually placed thereon, and the sound box stylus s manually placed at the beginning of the record spiral groove; thereupon, the switch contacts 158b may be closed in response to manual operation of the lever 162 to initiate another period of sound reproduction. With the finger extension of the actuating member 182 depressed, the aforesaid operations may be repeated as desired, the sole automatic function residing in the control exercised by the record eccentric groove e to discontinue operation of the motor M after each period of sound reproduction.

The actuating member 181, spaced from its transverse supporting pin, has pivoted thereto one end of a member or link 189 slidable in a lug 190 upstanding from the plate f1 and comprising an angular end 189a for coaction with the sloping face 191 of a leg of lever 30.

With the automatic mechanism connected in operative relation, that is, with the finger extension of the actuating member 182 in raised position, it may happen that the audience or listener do or does not care to hear the particular composition to be reproduced or being reproduced from the record then on the turntable T. If such is the case, the finger extension of the actuating member 181 may be raised and the end 189a of link 189 moved into engagement with the sloping face 191 of lever 30 whereby the latter is caused to actuate the flange 32a of lever 32. As a result, a cycle of operation of the automatic mechanism is immediately initiated and the particular record then on the turntable is removed therefrom and a new record transported thereto from the stack of records. After the finger extension of the actuating member 181 has been released, it returns to its depressed position under the influence of spring 186.

The control exercised by the actuating member 181 on the automatic mechanism is similar to the control exercised thereon by the record eccentric groove e except that, in the first case, the control is manually effected whereas in the latter case, said control is automatically effected.

Should the actuating lever 181 be operated while the finger extension of the actuating lever 182 is depressed, one end of the lever 30 engages the flange 173c of lever 173, the latter functioning to open the switch contacts 158b as hereinbefore described.

Disposed above the upper surface of plate f1 are two levers 192 and 193 both pivotally mounted on the same pin or member 194 upstanding from the plate f1. The lever 192 is spaced from the plate f1 by a sleeve 195 while lever 193 is spaced from lever 192 by the hub of a lever 196, said sleeve 195 and said hub being mounted on the pin 194.

Lever 192 comprises two arms 192a and 192b of substantially equal length, the arm 192b, adjacent its end, having pivoted thereto one end of a link 197, the other end of which is pivoted to the actuating lever 179 in a region thereof removed from its transverse supporting pin.

Lever 193 comprises two arms 193a and 193b of dissimilar lengths, the arm 193b, adjacent its end, having pivoted thereto one end of a link 198, the other end of which is pivoted to the actuating lever 180 in a region thereof removed from its transverse supporting pin.

The lever 196 comprises a depending lug or flange 196a, utilizable as hereinafter described, and a second depending lug or flange 196b to which is connected one end of a helical spring 199, or equivalent, the other end thereof being connected to a lug 192c depending from the lever 192 whereby said lever 196 is biased in a counter-clockwise direction, Figs. 6 and 7.

Lever 192 comprises a nose or extension 192d and lever 193 comprises a lug or flange 193c, each coactable with the lug 196b of lever 196, as hereinafter described.

If, during a period of sound reproduction, it is desired to repeat or to again reproduce sound from the record then on the turntable T, the finger extension of actuating lever 179 is moved upwardly, Figs. 1, 7 and 19, to thereby move the link 197 toward the right, Fig. 19, whereby the lever 192 is moved in a clockwise direction, Figs. 5, 6 and 7. As a result, the nose at the end of arm 192a is moved into engagement with the flange 89a of clutch segment 89, Fig. 6, to swing the latter in a counter-clockwise direction, Fig. 6, and to remove the tooth 89b of lever 89 from the depression in clutch wheel A3. In so doing, the crank arm A1 and cam K1 are uncoupled from the shaft 37 and, consequently, during the next cycle of the automatic mechanism, said crank arm A1 and cam K1 do not move with the cam shaft 37.

With the crank arm A1 and cam K1 thus uncoupled from the shaft 37, during the next cycle of the automatic mechanism the first stage and second stage record transporting conveyors are non-operative and do not transport a record toward the turntable T. The record transporting member L is similarly non-operative. Accordingly, the record R from which sound has just been reproduced is deposited, upon the members 59, from the turntable T as it is lowered, but said record R is not removed from the members 59 by the member L. Consequently, said record R remains on the members 59 until the turntable T is elevated to again carry it to the position occupied thereby during the preceding period of sound reproduction; in this position, the sound box stylus s, in the customary manner, engages the record spiral sound reproducing groove at its beginning and sound is reproduced twice from the same record in succession.

Under the influence of its spring 184, the actuating lever 179 remains elevated to retain lever 192 in the position to which it was moved clockwise, as described above, until the cycle of automatic operation is nearly concluded when the pin 36a projecting laterally from gear 36 engages the inclined face 192e of the arm 192b of lever 192. Just as the cycle of automatic operation is concluded, pin 36a moves the nose at the end of arm 192a of lever 192 out of contacting relation with the flange 89a of clutch segment 89 and spring 184 immediately becomes effective to fully depress the finger extension of actuating lever 179 and to restore the lever 192 to the position indicated in Fig. 6.

As described above, clutch segment 89 was actuated by lever 192 to remove the tooth 89b from the clutch wheel A3 before the cycle of the automatic mechanism was initiated. Accordingly, as the shaft 37 concludes its movement after passing through 360 degrees, the clutch wheel A3 assumes the proper position for the tooth 89b of clutch segment 89 to engage the depression formed therein which it does and the crank arm A1 and cam K1 are again coupled to shaft 37. In the absence of any further control when the cycle is next initiated, the automatic mechanism will function as an entirety; that is, the record from which sound has last been reproduced will be removed by the member L from the path of the turntable T and another record will be advanced into said path by the first and second stage carriages.

In the event that it is desired to reproduce sound successively and indefinitely from the same side of the same record, the finger extension of actuating lever 180 is elevated to thereby move the link 198 toward the right, Fig. 19, and to move the lever 193 in a clockwise direction, Figs. 5, 6 and 7. When thus moved, the nose at the end of arm 193a of lever 193 acts as did the nose of arm 192a of lever 192; that is, the nose of said arm 193a engages the flange 89a of clutch segment 89 to disengage the tooth 89b thereof from the clutch wheel A3. As a result and as described above, the crank arm A1 and cam K1 are rendered non-operative and the turntable T elevates the same record with the same face disposed upwardly as was moved downwardly by said turntable during the descent thereof.

In contra-distinction to the operation described above with respect to the lever 192, the lateral pin 36a of gear 36 is of such short length that it is not engageable with the lever 193. Accordingly, lever 193 and its nose on the end of arm 193a, is not retracted from the flange 89a of clutch segment 89 as was the corresponding nose of arm 192a of lever 192, and the crank arm A1 and cam K1 remain uncoupled from shaft 37 indefinitely, or until the finger extension of actuating lever 180 is manually or otherwise depressed to remove the nose of arm 193a of lever 193 from the flange 89a of clutch segment 89. When thus depressed, the automatic mechanism again functions as an entirety.

Clockwise movement, Figs. 5, 6 and 7, of lever 192 produces similar clockwise movement, Figs. 5, 6 and 7, of lever 196, since the nose 192d of lever 192 is coactable with the lug 196b of lever 196, Fig. 19. Clockwise movement, Figs. 5, 6 and 7, of lever 193 similarly produces clockwise movement, Figs. 5, 6 and 7, of lever 196 since its lug 193c is coactable with the lug 196b of lever 196, Fig. 19; in each case, clockwise movement of lever 196, as aforesaid, tensions the spring 199.

When the automatic mechanism is in cycle, the lever 32 has been swung to a limited extent in a counter-clockwise direction, Figs. 5, 6 and 7, and in so doing the end of its nose or extension 32f has been moved into the path of the lug 196a of lever 196. Accordingly, during a cycle of automatic operation, said extension 32f and lug 196a of lever 196 act as a lock to prevent clockwise movement, Figs. 5, 6 and 7, of either of levers 192 or 193 of sufficient extent to permit the noses of their respective arms 192a and 193a to come within the path of the flange 89a of clutch segment 89. When the automatic mechanism is out of cycle, the end of extension 32f of lever 32 is removed from the path of lug 196a of lever 196 and at this time, either of the levers 192 or 193 may be fully operated as described above. Accordingly, the aforesaid repeating mechanisms, either single or continuous and comprising, respectively, the levers 192 and 193, may be operated to control the clutch segment 89 only when the automatic mechanism is out of cycle.

As hereinbefore stated, either one record or a plurality thereof forming a stack of records is supported by the members 52 and, at times, by said members 52 and the angular fingers 39b of conveyor 39. Preferably, and as illustrated in Figs. 2, 10 and 11, the members 52 comprise beveled or sloping upper surfaces whereby friction is reduced and to better permit the accommodation of warped records thereon.

Obviously, it is necessary, in the form of my invention herein disclosed, that the center perforation of each record as the latter comes to rest on the members 59 at the end of its travel from left to right, Fig. 1a, shall be positioned vertically above the tip 107a of the turntable T. In accordance with the example of my invention herein illustrated, no especial care need be exercised when stacking the records, each record, as it is transported by the first-stage conveyor 39, being brought to such position laterally of the cabinet C that the record center perforation eventually takes the position described above. This result is attained by the angular fingers 39b of conveyor 39, one only or the other only of which engage the lowermost record of the stack of records, if said lowermost record is misplaced laterally of the cabinet C, to shift laterally said lowermost record during movement of carriage 39 from left to right, Figs. 1a and 4. Eventually, during continued movement of said lowermost record under the control of conveyor 39, it is brought to such position laterally of the cabinet C, that continued movement thereof in a straight-line direction causes the record center perforation to come to a position directly vertically above the tip 107a of the turntable T. When the record is thus properly positioned laterally of the cabinet C, both of the fingers 39b engage the rear edge of said record and move the same in a straight-line direction toward the center of the turntable T.

During transportation by the second-stage conveyor 50, the record is moved in the straight-line direction referred to above and, in the event that said record has not been moved to the proper position laterally of the cabinet C, the beveled ends of standards 50a function, as did the fingers 39b, to bring the record to the proper position laterally of the cabinet C.

When a record of large diameter, for example, one having a diameter of twelve inches is being transported by the second-stage conveyor 50, the forward or advanced edge of the record comes into engagement with the sloping surfaces 131b of the lever 131 to remove the extension 131c of said lever 131 from the path of lever 120, all as hereinbefore described. After the lever 131 has been depressed by engagement of said record of large diameter with its sloping surfaces 131b, the advanced or forward edge of said last named record comes into engagement with the vertical portions 131e of said lever 131, said vertical portions 131e serving as a stop to prevent further forward movement of said last named record, the beveled ends of the standards 50a meanwhile sliding beneath said last named record until the conveyor 50 has concluded its stroke toward the turntable T. The position which said last named record occupies, as movement thereof is thus discontinued by the vertical portions 131e of lever 131, is that position wherein the center perforation of said last named record is directly above the tip 107a of the turntable T. In this manner, records of large diameter are properly positioned upon the members 59 for eventual engagement by the turntable T.

When a record of smaller diameter, for example, one having a diameter of ten inches is being transported by the conveyor 50, it is transported from left to right, Fig. 1a, to the full extent permitted by the stroke of the conveyor 50 which, as it concludes its stroke toward the turntable T, leaves said last named record on the members 59 in such position that the record center perforation is directly above the turntable center. With a record of smaller diameter, as last described, the forward or advanced edge thereof is not brought into contacting relation with the sloping surfaces 131b of lever 131 or with any other part of said lever 131.

As hereinbefore pointed out, a spring 43 may be interposed between the first-stage conveyor 39 and the channel shaped member 41, Figs. 10 and 11. If for some reason, progress of the lowermost record of the stack of records toward the turntable T is positively prevented, such as may be caused, for example, by improper engagement of a warped record with the stripper members 65, the conveyor 39 swings in a counter-clockwise direction, Fig. 2, on the pivots 42 to permit the fingers 39b of conveyor 39 to pass beneath said lowermost record. In this manner, fracture of said last named record is prevented, since said conveyor 39, with its fingers 39b below the record whose progress was discontinued, continues to move toward the turntable T and then from said turntable while the spring 43 remains compressed. Eventually, as conveyor 39 moves from the turntable T, the angular fingers 39b of said conveyor 39 pass from beneath said last named record and, thereupon, the spring 43 becomes effective to raise the conveyor 39 to its proper position.

As illustrated particularly in Figs. 4 and 10, downward movement of each stripper member 65 is prevented by a set screw 66 so located, with the parts in the position illustrated in Fig. 10, that each stripper member 65 may move downwardly only a small distance. As hereinbefore described, each record is transported on to the horizontal sections 55a of levers 55, the latter, at the proper time, being operated to lower each record on to the members 58, the aforesaid horizontal sections 55a engaging the dogs 67 to thereby support the stripper members 65. The record, when it passes below the stripper members 65, engages the dogs 67 and swings them in a counter-clockwise direction, Fig. 3, said dogs 67 retaining the position to which thus swung during initiation of the lowering movement of the aforesaid horizontal sections 55a. However, as said horizontal sections 55a and the record supported thereon are lowered, downward movement of each stripper member 65 is prevented by its set screw 66. As a result, the record is lowered from the dogs 67 and, accordingly, said dogs 67 are free, under the influence of their respective spring 68, to resume their proper, or vertical, positions in their respective recesses in the stripper members 65.

As hereinbefore described, the horizontal sections 55a of levers 55 are prevented from moving upwardly further than illustrated in Fig. 10 because the upper surfaces of the lower horizontal sections of said levers 55 engage the lower surfaces of frame member F. Under some circumstances, it may be desirable to provide a dog or latch, not shown, which coacts with each of the levers 55 to positively maintain the horizontal sections 55a of said levers in the position illustrated in Figs. 3 and 10. When thus provided, said dogs or latches may be suitably released, as by members, not shown, carried by the first stage conveyor 39, said releasing members moving the dogs or latches from coacting relation with the lever 55 just prior to the time that the horizontal sections 55a of said levers 55 are depressed under the control of cam K5.

As illustrated particularly in Fig. 4, the end of lever 38, adjacent the carriage 39, comprises a slot constituting a lost motion arrangement for permitting the conveyor 39 to remain for a period of time in its extreme position toward the left, Figs. 1a and 4. By virtue of this arrangement, said conveyor 39 remains in said extreme position toward the left until a record R carried by the member L is transported to a position above the bars 52 from the vicinity of the turntable T. Accordingly, in accordance with my invention, if desired, sound may be alternatively produced from each side of a single record, said record being taken from the vicinity of the turntable T and deposited upon the bars 52 early in the cycle and before the conveyor 39 has started its movement toward the right, Figs. 1a and 4. However, soon after the record is thus deposited on the bars 52 and, during the continuance of the same cycle, as aforesaid, the first-stage conveyor 39 starts transporting the same record which has just been deposited on the bars 52 toward the turntable T, said record arriving in a position thereabove during the same cycle, as aforesaid, but with that face uppermost which was lowermost during the preceding period of sound reproduction.

Referring to Figs. 5, 6 and 7, one leg or extension of the lever 32 is illustrated as comprising a hook-shaped extremity 32g. When said lever 32 is swung counter-clockwise, Figs. 5, 6 and 7, to initiate a cycle of operation of the automatic mechanism, the hook-shaped extremity 32g of lever 32 moves into the path of the flange or abutment 166b of lever 166. Under such conditions, it results that the lever 162 may be swung counter-clockwise, Figs. 5, 6 and 7, only slightly, if at all. Accordingly, under the conditions stated, lever 173 may not be swung counter-clockwise, Figs. 5, 6 and 7, to an extent sufficient to open the switch contacts 158b. In accordance with this phase of my invention, operation of the motor M may not be suspended while the automatic mechanism is in cycle.

When the lever 162 is swung counter-clockwise, Figs. 5, 6 and 7, to produce similar movement of lever 173 and to open the switch contacts 158b, the lug or flange 173d of lever 173 moves into the path of the pin 8a upstanding from the clutch crescent 9. When the switch contacts 158b were opened, as aforesaid, operation of the motor M was discontinued and, during such a period, even though the lever 32 is moved counter-clockwise, Figs. 5, 6 and 7, to disengage its lugs 32b from the end of clutch crescent 9, engagement will not be effected between the clutch crescent tooth 9a and the clutch wheel 10 since, under the conditions stated, the flange or lug 173d of lever 173 prevents any substantial movement of clutch crescent 9 in a clockwise direction, Figs. 5, 6 and 7. Accordingly, with the switch contacts 158b held open by lever 173, no act may be performed which will cause the clutch crescent tooth 9a to engage the clutch wheel 10. In other words, with the operation of the motor M discontinued, the mechanism may be again started when "out of cycle" and not when "in cycle".

It shall be understood that any or all of the various hereinbefore described auxiliary features, as those controlled by the levers 179, 180, 181 and 182 together with the sets of mechanism comprised respectively therein may be omitted or utilized as desired. Such features, particularly as regard the repeating mechanisms controlled by the levers 179 and 180, ordinarily, are omitted when the hereinbefore described apparatus is remotely operated, as by a coin control system with which my invention may be advantageously associated.

In general, the operation is as follows:

With a record R on the turntable T and with the stylus s of sound box S engaging the spiral sound reproducing groove on said record, sound is reproduced until just before the time that stylus s engages the eccentric groove e of said record R. During the period of sound reproduction, the automatic mechanism is "out of cycle".

Under the influence of the eccentric groove e of said record R, the sound box S and tone arm 16 are moved in a direction the reverse of that taken thereby during the period of sound reproduction. As a result, lever 32 is swung in a counter-clockwise direction, Figs. 5, 6 and 7, to permit engagement of the clutch crescent tooth 9a with the clutch wheel 10. Thus, cam shaft 37 is coupled to the main drive shaft 4 and at this time the automatic mechanism is "in cycle".

As illustrated particularly by the timing chart of Fig. 20, the cam K3 immediately becomes effective to permit descent of the turn table T which reaches its lowermost position after cam shaft 37 has moved through an angle of approximately 20 degrees, said record R meanwhile having been deposited on the members 59. The turn table T remains in its lowermost position until cam shaft 37 has moved through an angle of approximately 310 degrees.

After the cam shaft 37 has moved through an angle of approximately 30 degrees, cam K1 becomes effective to swing the member L along a substantially arc-shaped path to carry said record R from the members 59 to its position of rest at the top of the stack of records where it is deposited in inverted relation to that occupied thereby during the period of sound reproduction. Member L swings from the turntable T and then toward the same and comes to rest in its normal position, Figs. 1a and 2, after the cam shaft 37 has moved through an angle of approximately 140 degrees.

Soon after said record R departs from the sound reproducing position under the control of turn table T, as aforesaid, and after cam shaft 37 has moved through an angle of approximately 12 degrees, the sound box S and tone arm 16 are swung in a counter-clockwise direction, Fig. 1a, to position the stylus s without a projection extending vertically from the periphery of any record that will subsequently be transported to the turntable T. The sound box S moves into the position last described after cam shaft 37 has moved through an angle of approximately 35 degrees. Said sound box S remains in this position until cam shaft 37 has moved through an angle of approximately 290 degrees.

At the start of the cycle of the automatic mechanism, the first stage conveyor 39 starts to move from right to left, Fig. 2, and reaches its extreme position toward the left, Fig. 2, when cam shaft 37 has moved through an angle of approximately 80 degrees. Due to the lost motion slot in the end of link 38, conveyor 39 remains in said extreme position until cam shaft 37 has moved through an angle of approximately 110 degrees. At this time, said conveyor 39 starts to move from left to right, Fig. 2, and, in the example shown, carries the lowermost record R of the stack of records in the same direction, said conveyor 39 reaching its maximum position toward the right, Fig. 2, after the cam shaft 37 has moved through an angle of approximately 260 degrees.

Meanwhile, or after cam shaft 37 has moved through an angle of approximately 90 degrees, the second stage conveyor 50 starts to move from right to left, Fig. 2, and reaches its extreme position toward the left, Fig. 2, after said cam shaft has moved through an angle of approximately 140 degrees. The second stage conveyor 50 remains in the position last described until cam shaft 37 has moved through an angle of approximately 255 degrees at which time it starts to move from left to right, Fig. 2, to transport the record from the now depressed sections 55a of levers 55. After cam shaft 37 has moved through an angle of approximately 320 degrees, movement of the second stage conveyor 50 toward the right, Fig. 2 is concluded at which time the record is directly above the turntable T. This result is obtained as hereinbefore described no matter whether said record is one of large or small diameter.

After the cam shaft 37 has moved through an angle of approximately 80 degrees, cam K5 permits the spring 143 to elevate, or tend to elevate, the levers 141. As hereinbefore described, said levers 141, under certain conditions, cushion the descent of a record as it is discharged from the member L. During continued movement of cam K5 from an angle of approximately 80 degrees to an angle of approximately 115 degrees, said cam K5 thus permits control of the levers 141. Cam K5, as hereinbefore described, also controls depression of the sections 55a of levers 55, initiation of this action occurring when cam shaft 37 has moved through an angle of approximately 240 degrees, said sections 55a remaining depressed until said cam shaft 37 has moved through an angle of approximately 325 degrees.

After the record R is deposited on the members 59 as described above and after cam shaft 37 has moved through an angle of approximately 310 degrees, upward movement of the turntable T is initiated and said record is carried from said members 59 into the sound reproducing position which is reached when cam shaft 37 has moved through an angle of approximately 350 degrees.

Prior to the time that turntable T was thus elevated or after cam shaft 37 has moved through an angle of approximately 290 degrees, the tone arm 16 and sound box S are swung, by cam K4, in a clockwise direction, Fig. 1a, until the stylus s of sound box S is so positioned above the record therebelow that it coincides with a line extending vertically from a point just without the spiral sound reproducing groove of the record. While remaining in this position, the record being elevated, engages the stylus s and slightly elevates the sound box S before said record moves into sound reproducing position, the latter occurring after shaft 37 has moved through an angle of approximately 345 degrees. Immediately thereafter, and in quick succession, the sound box stylus s is gently fed into the beginning of the spiral sound reproducing groove and lever 119, under the influence of cam K4, is so controlled that parts carried thereby are retracted from the stem 112 of tone arm 116.

Immediately after the action last noted, the cycle of automatic mechanism is concluded and a period of sound reproduction ensues; after the sound box stylus s passes from the spiral sound reproducing groove, in response to a control exercised by the eccentric groove e of the record R then on the turntable T or earlier, by manipulation of the actuating extension of lever 181, the cycle of operation of the automatic mechanism is again initiated whereby, in automatic sequence, the steps just described are repeated.

Although the machine or mechanism constructed in accordance with my invention is intended particularly for records wherein the spiral sound reproducing groove terminates in a circular groove eccentrically disposed with respect to the record center, it shall be understood that my invention is not to be thus limited. Under some circumstances, it may be desirable to successively initiate cycles of the automatic mechanism otherwise than by a control performed by the eccentric grooves on the respective records. Thus, for example, the control may be effected by the type of groove which comprises generally a large pitch spiral extending from the spiral sound reproducing groove and terminating in a circular groove concentrically disposed with respect to the record center.

It shall also be understood that in no manner at all is my invention to be limited to the utilization of an acoustical or mechanical type of sound box wherein sound waves originated by the sound box diaphragm are transmitted through a tone arm or taper tube and thence to an amplifying horn. In lieu of a sound box, as aforesaid, any desired type of a pick-up may be utilized, such a pick-up, as well understood in the art, generating or modifying an electrical current in response to actuation of an armature, or equivalent, by the talking machine or phonograph records, the aforesaid electrical current operating a loud speaker, or equivalent, disposed either in the same casing containing the automatic mechanism or in a casing separate therefrom, as desired.

In certain aspects, it shall be understood that my invention is not to be limited to the utilization of a plurality of conveyors, or equivalent, for transporting records in succession to the talking machine or phonograph turntable. Thus, it may be desirable to provide a single conveyor for transporting records in the manner just specified and, in any event, the conveyor or conveyors may be of any desirable form, specifically different, if desired, from that herein illustrated and described. The utilization of a single conveyor is desirable and satisfactory, usually, when the lowermost record of the stack of records is separated from the stack prior to initiation of its movement toward the turntable, as when all records of the stack of records are elevated save the lowermost record which is transported from beneath the stack of records while the latter is held elevated. It shall be understood that an arrangement of the character thus generally described is within the purview of my invention.

It shall also be understood that my invention is not to be limited to the removal of records from a stack of records because, under some circumstances and in lieu of a stack of records, there may be provided a group of records disposed in superposed or side-by-side relation wherein each record, usually, is not in contacting relation with the immediate neighboring records. Still further, it shall be understood that my invention is not to be limited to the successive removal of the respective lowermost records of the stack of records or of the similarly placed records of the superposed or side-by-side records.

It shall also be understood that records may be removed in succession from the turntable in a variety of ways. Thus, as regards certain aspects of my invention, said records may be removed from said turntable and deposited, not in inverted relation, but in the same relation that they occupied during the respective periods of sound reproduction. However, as hereinbefore stated, as regards a very important feature of my invention, records are deposited at the top of a stack of records in inverted relation to that occupied thereby during the respective periods of sound reproduction. The structure, device or mechanism for accomplishing the result last named may assume any one of a number of mechanical forms quite different, if desired, from the herein described member L.

An important feature or advantage of the hereinbefore described system or arrangement for manipulating talking machine or phonograph records resides in the provision of the reciprocatory turntable for successively elevating records to and removing them from the sound reproducing position. By virtue of this arrangement, lateral movement of the sound box, or equivalent, and its tone arm, or equivalent, is effected in such manner that a given point thereon moves only in a single plane, usually a horizontal plane, neglecting, of course, the movement of the sound box, or equivalent, early and late in each cycle when it leaves and is engaged by a record supported on the descending and rising turntable.

Although but a single motive device has been herein illustrated and described for jointly operating the turntable and the automatic mechanism it shall be understood, if desired, that a plurality of motive devices may be utilized, one to operate the turntable and another to operate the automatic mechanism, the eccentric groove or other control connecting said automatic mechanism to its motive device at the proper times to effect the series of automatic operations.

For purposes of explanation, there has been incorporated into the drawings of this application, the cam and crank arm timing diagram illustrated in Fig. 20, together with references thereto in the specification proper. It shall be understood that the timing arrangement thus illustrated and described is typical of but one of a number of different timing arrangements for accomplishing the purpose of my invention.

Although the various controls have been hereinbefore described as performed mechanically, i. e. by levers, links, etc., it shall be understood that my invention is not to be limited to such arrangements. Thus, for example, as illustrated in Fig. 21, a lever 32A, corresponding with the aforesaid lever 32a, may be actuated electro-mechanically in lieu of mechanical actuation thereof. To this end, there may be provided a lever 27A corresponding with the aforesaid lever 27, said lever 27A being controlled by the pawl 24 in substantially the same manner as is lever 27. Lever 27A comprises an extension or nose adapted, upon movement in a clockwise direction, Fig. 21, to close the contact members 210 forming the terminals of an electric circuit comprising the conductors 211 in which there is included a suitable source of electrical energy, not shown. Included in the circuit of conductors 211 is a coil or winding 212 disposed in coacting relation with a group of magnetizable members 213 magnetically coacting with an armature 214 secured to and carried by the lever 32A.

With an arrangement of the character illustrated in Fig. 21, the eccentric groove e, or equivalent, after a period of sound reproduction, causes clockwise movement, Fig. 21, of lever 27A whereby the coil 212 is energized to cause movement of lever 32A in a counter-clockwise direction, Fig. 21. As a result, the clutch segment tooth 9a comes into engagement with clutch wheel 10 to initiate a cycle of operation of the automatic mechanism. In this manner, control may be effected without utilizing link 28 and levers 29 and 30.

Arrangements of both types are applicable to my invention; under some circumstances the mechanical type being preferable and under other circumstances the electro-mechanical type being preferable.

Although I have thus illustrated a modified arrangement for actuating only the lever 32A to initiate the cycle of automatic operation, it shall be understood that all or some of the various other control operations herein described as performed purely mechanically may be performed electro-mechanically in generally the same manner.

What I claim is:

1. In combination, means for transporting a talking machine or phonograph record from a position of rest to a sound reproducing position, means for reproducing sound from said record while in said sound reproducing position, and means for depositing said record in or adjacent said position of rest in inverted relation to that occupied thereby during the period of sound reproduction, said record depositing means being adapted to transfer records of different diameters.

2. In combination, means for transporting a talking machine or phonograph record in one direction to a sound reproducing position, means for reproducing sound from said record while in said sound reproducing position, and means for depositing said record in a position removed from said sound reproducing position in inverted relation to that occupied thereby during the period of sound reproduction, said record depositing means including a pivotally oscillating member adapted to transfer records of different diameters.

3. In combination, means for transporting talking machine or phonograph records of different sizes along a path to a sound reproducing position, means for reproducing sound from each record while in said sound reproducing position, and means for depositing said records in a position removed from said sound reproducing position in inverted relation to that occupied thereby during the period of sound reproduction, said records travelling from said sound reproducing position to said removed position along a substantially arc-shaped path disposed above said first named path.

4. In combination, means for transporting talking machine or phonograph records of different sizes arranged in any desired order from a group of superposed records to a sound reproducing position, means for reproducing sound from said records while in said sound reproducing position, and means for depositing said records at the top of said group of superposed records.

5. In combination, means for transporting talking machine or phonograph records of different sizes arranged in any desired order from a group of superposed records to a sound reproducing position, means for reproducing sound from said records while in said sound reproducing position, and means for depositing said records at the top of said group of superposed records in inverted relation to that occupied thereby during the period of sound reproduction.

6. In combination, means for transporting talking machine or phonograph records of different sizes arranged in any desired order along a substantially rectilinear path from a group of records to a sound reproducing position, means for reproducing sound from said records while in said sound reproducing position, and means for depositing said records at the top of said group of records.

7. In combination, means for transporting talking machine or phonograph records of different sizes arranged in any desired order along a substantially rectilinear path from a group of records to a sound reproducing position, means for reproducing sound from said records while in said sound reproducing position, and means for depositing said records at the top of said group of records in inverted relation to that occupied thereby during the period of sound reproduction.

8. In combination, means for successively transporting the respective records defining one end of a stack of records along a substantially rectilinear path to a sound reproducing position, means for successively reproducing sound from said transported records, an oscillatable hoop-like member for successively depositing said transported records at the top of said stack of records, and means for depositing said records on said hoop-like member.

9. In combination, means for successively transporting the respective records defining one end of a stack of records along a substantially rectilinear path to a sound reproducing position, means for successively reproducing sound from said transported records, an oscillatable hoop-like member for successively depositing said transported records at the top of said stack of records in inverted relation to that occupied thereby during the respective periods of sound reproduction, and means for depositing said records on said hoop-like member.

10. In combination, means for successively transporting into substantial alignment with a sound reproducing position the respective lowermost records of a stack of records, means for moving the transported records into sound reproducing position, means for successively reproducing sound from each of said transported records, and swinging means for successively depositing said transported records at the top of said stack of records.

11. In combination, means for successively transporting into substantial alignment with a sound reproducing position the respective lowermost records of a stack of records, means for moving the transported records into sound reproducing position, means for successively reproducing sound from said transported records, and means for successively depositing said transported records at the top of said stack of records in inverted relation to that occupied thereby during the respective periods of sound reproduction.

12. In combination, means for transporting a talking machine or phonograph record along a path, a turntable movable transversely of said path for carrying said record to a sound reproducing position, means for reproducing sound from said record, and means for depositing said record in a position removed from said sound reproducing position and in inverted relation to that occupied thereby during the period of sound reproduction.

13. In combination, means for transporting a talking machine or phonograph record along a path leading from a group of superposed records, a turntable movable transversely of said path for carrying said record to a sound reproducing position, means for reproducing sound from said record, and means for reassociating said record with said group of superposed records.

14. In combination, means for transporting a talking machine or phonograph record along a path leading from a group of superposed records, a turntable movable transversely of said path for carrying said record to a sound reproducing position, means for reproducing sound from said record, and means for reassociating said record with said group of superposed records in inverted relation to that occupied thereby during the period of sound reproduction.

15. In combination, means for transporting a talking machine or phonograph record along a path leading from a group of superposed records, a turntable movable transversely of said path for carrying said record to a sound reproducing position, means for reproducing sound from said record, and means for depositing said record at the top of said group of superposed records.

16. In combination, means for successively transporting the respective lowermost records of a stack of records along a path, a turntable movable transversely of said path for successively carrying each of said transported records to a sound reproducing position, means for successively reproducing sound from each of said transported records, and means for successively depositing said transported records at the top of said stack of records.

17. In combination, means for successively transporting the respective lowermost records of a stack of records along a path, a turntable movable transversely of said path for successively carrying each of said transported records to a sound reproducing position, means for successively reproducing sound from each of said transported records, and means for successively depositing said transported records at the top of said stack of records in inverted relation to that occupied thereby during the respective periods of sound reproduction.

18. In combination, a support for a stack of talking machine or phonograph records of different diameters arranged in any desired order, a turntable spaced therefrom, means for transporting individual records of different diameters toward said turntable, and means operable with records of different diameters and disposed between said stack of records and said turntable for receiving and further transporting a record in the same direction toward said turntable.

19. In combination, a support for a stack of talking machine or phonograph records, a turntable spaced therefrom, spaced tracks leading from said stack of records toward said turntable, means for successively transporting the respective lowermost records of said stack of records along said tracks and toward said turntable, and stripper members including pivoted elements coacting, respectively, with each of said tracks for controlling passage of but one record at a time toward said turntable.

20. The combination with a turntable adapted to have a talking machine or phonograph record disposed thereon, of an oscillatory member normally positioned without the periphery of said turntable and below its upper surface for removing said record therefrom, said member comprising offset prongs between which and said member proper said record is received.

21. In combination, means for successively removing records from a group of contacting superposed talking machine or phonograph records of different diameters and transporting them to a sound reproducing position, means for successively reproducing sound from said records of different diameters, and means for returning said records of different diameters in succession to the group of superposed records.

22. In combination, means for successively removing records from a group of contacting superposed talking machine or phonograph records of different diameters and transporting them to a sound reproducing position, means for successively reproducing sound from said records of different diameters, and means for reassociating said records of different diameters in succession with the group of superposed records and in inverted relation to that occupied thereby during the respective periods of sound reproduction.

23. In combination, means for successively removing the respective records defining one end of a stack of talking machine or phonograph records of different diameters and transporting them to a sound reproducing position, means for successively reproducing sound from said records of different diameters, and means for returning said records of different diameters in succession to the opposite end of the stack of records.

24. In combination, means for successively removing the respective records defining one end of a stack of talking machine or phonograph records of different diameters and transporting them to a sound reproducing position, means for successively reproducing sound from said records of different diameters, and means for depositing said records of different diameters in succession at the opposite end of the stack of records in inverted relation to that occupied thereby during the respective periods of sound reproduction.

25. The combination with a turntable and means for supporting a stack of superposed talking machine or phonograph records of different diameters, of means for successively transporting records of different diameters to a position above said turntable with the record centers coinciding with the turntable axis of rotation, sound reproducing means, and means for operatively associating said reproducing means with records of different diameters comprising a stop device depressed by the records of larger diameter.

26. The combination with a turntable and means for supporting a stack of superposed talking machine or phonograph records of different diameters whose centers are not aligned, of means for successively transporting records of different diameters although the centers of the records are not in alignment to a position above said turntable with the record centers coinciding with the turntable axis of rotation, said means comprising a rectilinearly-reciprocating conveying device adapted to engage the periphery of each record and movable between the same limits for records of different diameter.

27. The combination with a turntable and means for supporting a stack of superposed talking machine or phonograph records of different diameters, and a movable sound reproducing instrumentality, of means for successively transporting records of different diameters to a position above said turntable with the record centers coinciding with the turntable axis of rotation, and means for operatively associating said sound reproducing instrumentality with records of different diameters and comprising a stop device depressed by the records of larger diameter and operative to adjust the operation of said last named means to the beginning of a record of larger diameter.

28. In combination, a turntable, means for transporting a talking machine or phonograph record to said turntable, means for reproducing sound from said record, means for removing said record from said turntable and transporting it toward a position of rest, and a movable device for gently lowering said record into said position of rest.

29. The combination in a system for reproducing sound during successive periods comprising a turntable, a source of power, and clutch mechanism, of cyclicly automatic mechanism comprising means for depositing talking machine or phonograph records in succession in alignment with said turntable, means for moving said turntable to remove the deposited records to playing position and after playing redeposit said records, a separate device for removing said records in succession from the vicinity of said turntable and depositing them in inverted relation to that occupied thereby during the respective periods of sound reproduction, means effective at the termination of each period of sound reproduction for operating said clutch mechanism to connect said source of power to said automatic mechanism, and means effective at the termination of each cycle of operation of said automatic mechanism for disconnecting the source of power therefrom.

30. The combination in a system for reproducing sound during successive periods, said system comprising a turntable, a source of power, and clutch mechanism, of cyclicly automatic mechanism comprising means for depositing talking machine or phonograph records in succession in alignment with said turntable, means for moving said turntable to remove the deposited records to playing position and after playing redeposit said records, a separate device movable only substantially along the arc of a circle for removing said records in succession from the vicinity of said turntable and depositing them in inverted relation to that occupied thereby during the respective periods of sound reproduction, means effective at the termination of each period of sound reproduction for operating said clutch mechanism to connect said source of power to said automatic mechanism, and means effective at the termination of each cycle of operation of said automatic mechanism for disconnecting the source of power therefrom.

31. In a system for reproducing sound during successive periods, said system comprising means supporting a stack of talking machine or phonograph records, a turntable, cyclicly automatic mechanism comprising a shaft, devices coupled to said shaft for rotation therewith, separate means operated by said devices for successively transporting said records from said stack to said turntable, for reproducing sound from said records in succession and for successively transporting said records from said turntable back to said stack, means effective at the termination of each period of sound reproduction for producing a cycle of operation of said automatic mechanism, and means for retaining one of said devices uncoupled from said shaft during a desired cycle of said automatic mechanism.

32. The combination in a system for reproducing sound during successive periods, said system comprising a turntable, a source of power, and clutch mechanism, of cyclicly automatic mechanism comprising a shaft, devices coupled to said shaft for rotation therewith, means operated by said devices for successively transporting talking machine or phonograph records to said turntable, reproducing sound from said records in succession and successively transporting said records from said turntable, means effective at the termination of each period of sound reproduction for operating said clutch mechanism to connect said source of power to said automatic mechanism, means for retaining one of said devices uncoupled from said shaft during a desired cycle of operation of said automatic mechanism, and means for automatically recoupling said one of said devices to said shaft at the conclusion of said desired cycle of operation of said automatic mechanism.

33. In a system for reproducing sound during successive periods, said system comprising means supporting a stack of talking machine or phonograph records of varying diameters, a turntable, sound reproducing means, cyclicly automatic mechanism for successively transporting said records of varying diameters from said supporting means to said turntable, for reproducing sound from said records in succession and for successively transporting said records from said turntable to said stack and inverting the same, means effective at the termination of each period of sound reproduction and operated by a reverse movement of said sound reproducing means for producing a cycle of operation of said automatic mechanism, and means for manually controlling the operation of said last named means.

34. In a system for reproducing sound during successive periods, said system comprising a turntable, cyclicly automatic mechanism for successively transporting talking machine or phonograph records to said turntable, for reproducing sound from said records in succession and for successively transporting said records from said turntable, a motive device for operating said automatic mechanism, means effective at the termination of each period of sound reproduction for producing a cycle of operation of said automatic mechanism by power applied thereto by said motive device, and means automatically rendered effective for preventing operation of said last named means while said motive device is non-operative.

35. In combination, a turntable, means for transporting talking machine or phonograph records of different sizes from a group of superposed records into coacting relation with said turntable, an instrumentality movable across the face of said records for reproducing sound, and a member oscillating about a fixed axis from a substantially horizontal position to a position past the vertical for automatically reassociating said records with said group of superposed records after the period of sound reproduction.

36. The combination with a turntable mounted for rectilinear reciprocation in a vertical direction and adapted to carry a talking machine or phonograph record, an instrumentality coacting with said record while in an upper position to reproduce sound, means for lowering said turntable and record after a period of sound reproduction, and means timed with said first named means for removing said record from the vicinity of said turntable and for depositing it in inverted relation to that occupied thereby during the period of sound reproduction.

37. In an automatic phonograph, a turntable, a reservoir adapted to hold a stack of records placed one upon the other, means for sliding records of different sizes successively from said reservoir to said turntable, and means for returning each record from said turntable to the reservoir and placing each record in inverted position on the uppermost record in the reservoir.

38. In an automatic phonograph, a turntable, a reservoir adapted to hold a plurality of disk records placed one upon the other, a reciprocatory member adapted to engage and slide the lowermost record from said reservoir, a second reciprocatory member for sliding said record to playing position over the turntable, and means for removing each record from said turntable and restoring it to said reservoir in inverted position.

39. In a phonograph wherein the tone arm carrying a reproducing needle is automatically moved from a point beyond the periphery of a disk record on a turntable and said needle is placed in a sound groove in said record and is subsequently removed from said record and returned to its position beyond the periphery of the record after the latter has been played, the combination of a record receptacle in which the records of different sizes are supported one upon the other in any desired order, record feeding means for sliding a record from said receptacle onto said turntable in position to have said needle engage a sound groove thereon and means for removing said record from the turntable after the tone arm has been removed beyond the periphery of said record, said record removing means reversing said record and restoring the same to said receptacle in position to have its reverse side engaged by said needle the next time it is placed on the turntable by said record feeding means.

40. In an automatic phonograph, a turntable, a reservoir for a series of disk records supported one upon the other and adapted to be fed by gravity to a position to be successively removed from said reservoir to said turntable, means for removing each record from the turntable after it is played and restoring it to the reservoir, means for moving the record from the reservoir into alignment with the turntable and means for moving the table to place the record in playing position, each record being reversed during its movement from the turntable to the reservoir.

41. In a machine of the character described, a turntable, a rack adjacent thereto for supporting a supply stack of records, an oscillating carrier operable between the rack and turntable, means for delivering records of different sizes one at a time from the bottom of the stack onto the carrier, means for moving said carrier to convey the records to the turntable and means automatically operable incident to the completion of playing a record for causing the return of the played record to the supply stack.

42. In a sound reproducing device, the combination with a rotatable support, of a magazine adapted to receive a plurality of records of different sizes arranged in any desired order in vertical stacked relation, an oscillatable hooplike member for overturning a record from said support to effect the transfer thereof to said magazine, and means operative in timed relation with said transferring means to slidably move the lowermost record from said magazine to said support.

43. In a sound reproducing device, the combination with a sound reproducing mechanism, of a carrier for receiving a plurality of records of different sizes arranged in any desired order in contacting stacked relation, a member oscillatable about a fixed axis through more than a right angle and operable in timed relation responsive to said reproducing mechanism for overturning the record from said reproducing mechanism to effect the transfer thereof to said carrier and means to slidably withdraw another record therefrom for transfer to said reproducing mechanism.

44. In an automatic sound reproducing device, the combination with a rotatable support for a record, a sound reproducing mechanism arranged for operative association with the record on said support, a magazine for retaining a plurality of records of different sizes arranged in any desired order in vertical stacked contacting relation, a record elevating means pivoted on a fixed axis and movable through more than a right angle for inverting the record incident to the transfer thereof from said support to said magazine, means for slidably transferring a record from said magazine to said support, and means for actuating said transferring means in timed sequence with said rotatable support.

45. In a sound reproducing device, the combination with a turntable, of a carrier for receiving a plurality of records of different sizes arranged in any desired order in vertical stacked contacting relation, reciprocating means for sliding the lowermost record from said carrier to said turntable, a pivotal record transferring hoop normally in the plane of said turntable to elevate a record from said turntable to said carrier, a reproducing mechanism oscillatable vertically and horizontally over said turntable to engage a record thereon at predetermined intervals, and means for operating said reproducing means, reciprocating means and pivotal means in timed relation.

46. In a talking machine, the combination of a turntable, sound reproducing mechanism, means for supporting a stack of records to be played one upon another, means for moving the lowermost record to free the same from said stack, transfer means for engaging a freed record and transferring it to said turntable and means for discharging a played record from said turntable and returning said record to said stack.

47. In a talking machine, the combination of a turntable, sound reproducing mechanism, means for supporting a stack of records to be played one upon another, means for moving the lowermost record to free the same from said stack, transfer means for engaging a freed record and transferring it to said turntable and means for discharging a played record from said turntable and returning said record to the top of said stack in inverted relationship.

48. In a talking machine, the combination of a turntable, sound reproducing mechanism, means for supporting a stack of records to be played one upon another, means for moving the lowermost record to free the same from said stack, transfer means for engaging a freed record and transferring it to said turntable and means for discharging a played record from said turntable, said last-named means including a hoop-like member directly returning said record to said stack.

49. In a talking machine, the combination of a turntable, sound reproducing mechanism, means for supporting a stack of records to be played one upon another, means for moving the lowermost record to free the same from said stack, transfer means for engaging a freed record and transferring it to said turntable and means for discharging a played record from said turntable, said last-named means including a hoop-like member directly returning said record to the top of said stack in inverted relationship.

50. In a talking machine, the combination of a turntable, sound reproducing mechanism, means for supporting a plurality of record tablets of different diameters, means for transferring record tablets to said turntable, means for returning tablets to said record supporting means and inverting the same during such return, means for moving said sound reproducing mechanism to starting position, and means engageable by the edge of a record tablet for predetermining the extent of operation of said means for moving said sound reproducing mechanism and thereby predetermining the starting position of said sound reproducing mechanism in conformity with the diameter of said tablet.

51. In a talking machine, the combination of a turntable, sound reproducing mechanism, means for supporting a plurality of record tablets of different diameters, means for transferring record tablets to said turntable, means for returning tablets to said record supporting means and inverting the same during such return, means for moving said sound reproducing mechanism first exteriorly of the periphery of said turntable and then inwardly to the starting positions of tablets of different diameters, and means engageable by the edge of a record tablet for predetermining the extent of operation of said means for moving said sound reproducing mechanism and thereby predetermining the extent to which said sound reproducing mechanism is moved inwardly to conform with the starting position of the record tablet in playing position.

52. In a talking machine, the combination of a turntable, sound reproducing mechanism, means for supporting a plurality of record tablets of different diameters and arranged in any desired sequence, means for transferring said tablets from said record supporting means to said turntable, means for inverting and returning the same to said record supporting means, said means being operative for tablets of different diameters, and means for moving said sound reproducing mechanism to the starting position for tablets of different diameters and including a normally operative member moved out of its normally operative position by engagement with the edge of a tablet of larger diameter.

53. In a talking machine, the combination of a turntable, sound reproducing mechanism, means for supporting a stack of record tablets of different diameters and arranged in any desired order, means operative for tablets of different diameters to transfer the lowermost record in said stack to said turntable, means operative for tablets of different diameters to return a tablet from said turntable to the top of said stack, and means for moving the sound reproducing mechanism outwardly from the end of a played record to the beginning of the record tablet next disposed on said turntable and controlled by the diameter of said last-named tablet as it is moved to said turntable.

54. In a talking machine, the combination of a turntable, sound reproducing mechanism, means for supporting a stack of record tablets of different diameters and arranged in any desired order, means operative for tablets of different diameters to transfer the lowermost record in said stack to said turntable, means operative for tablets of different diameters to return a tablet from said turntable to the top of said stack, said means being operative to invert a tablet with respect to its former position on said record supporting means, and means for moving the sound reproducing mechanism outwardly from the end of a played record to the beginning of the record tablet next disposed on said turntable and controlled by the diameter of said last-named tablet as it is moved to said turntable.

55. In combination with a magazine for holding a plurality of talking machine or phonograph records and a turntable for supporting a record in sound reproducing position, a pair of successively acting means for moving a record from the magazine to said table, means for driving said record moving means at different speeds, said means which removes the record from the magazine being driven at the lower speed and the means which advances the record to the turntable being driven at the higher speed, and means for returning said record to said magazine.

56. In combination with a magazine for supporting a plurality of talking machine or phonograph records, a turntable, means for moving records from said magazine to said turntable, and means for returning a record from said turntable to said magazine, said last-named means comprising a pivotally mounted hoop embracing said turntable and adapted to engage and remove small as well as large records mounted on said turntable, and means carried by said hoop and into which records of different sizes may slide by gravity for retaining said records of different sizes in operative relationship to said hoop as said hoop is swung to return the records to said magazine, the same means being effective to retain records of different diameters.

57. In combination with a magazine for supporting a stack of talking machine or phonograph records in vertical superposed relationship, a turntable, sound reproducing means, means for sliding the lowermost record of said stack laterally out of said stack and into alignment with said turntable, means for raising and lowering said turntable to move a record into and out of engagement with said sound reproducing means, and means for returning a played record to the top of said stack.

58. In combination with a magazine for supporting a stack of talking machine or phonograph records in vertical superposed relationship, a turntable, sound reproducing means, means for sliding the lowermost record of said stack laterally out of said stack and into alignment with said turntable, means for raising and lowering said turntable to move a record into and out of engagement with said sound reproducing means, and means for inverting and returning said played record to the top of said stack.

59. In combination with a magazine for holding a stack of talking machine or phonograph records, a turntable, sound reproducing mechanism, means for moving said reproducing mechanism to the beginning of a record on said turntable, means for moving the lowermost record of said stack to said turntable, means for removing the played record from the turntable and restoring the same to the top of said stack, means for temporarily rendering said record moving and removing means inoperative, said means for moving said reproducing mechanism then operating to repeat the record on said turntable, and means for automatically reestablishing the operation of said record moving and removing means after one repetition of the record on said turntable.

60. In combination with a magazine for holding a plurality of talking machine or phonograph records, a turntable, sound reproducing means, means for moving records from said magazine to said turntable and from said turntable to said magazine, means for swinging the sound reproducing means outwardly from the end of one record and inwardly into cooperative relationship with the beginning of the next record, and friction means automatically movable into engagement with said swinging sound reproducing means to control the movement thereof during both outward and inward movement of the sound reproducing means.

61. In combination with a magazine for supporting a stack of talking machine or phonograph records, a turntable, sound reproducing means, means for moving the lowermost tablet in said stack to said turntable, means for returning the played record from the turntable to the top of said stack, and means automatically movable into position for cooperation with the returned record to cushion its descent into said magazine.

62. In combination with a magazine for supporting a stack of talking machine or phonograph records, a turntable, sound reproducing means, means for moving the lowermost tablet in said stack to said turntable, means for returning the played record from the turntable to the top of said stack, means automatically movable into position for cooperation with the returned record to cushion its descent into said magazine, and means for rendering said last-named means inoperative when said stack contains more than a predetermined number of records.

63. In combination with a magazine for holding a stack of talking machine or phonograph records, a turntable, means for transferring the lowermost tablet from said stack to said turntable, said means including a reciprocating carriage adapted to strip the lowermost tablet from said stack, a second reciprocating carriage adapted to transport a record into cooperative relationship with said turntable, and means for lowering a record from said first named carriage to said second named carriage.

64. In combination with a magazine for supporting a stack of talking machine or phonograph records, a turntable, sound reproducing means, means for moving records of different sizes from the bottom of said stack to said turntable and from said turntable to the top of said stack, means for moving said sound reproducing mechanism outwardly from the end of a played record and then inwardly to the beginning of the next record in operative relationship on said turntable, said means having the capacity to move said sound reproducing means into the starting position of records of different diameters, and means operated by the movement of a record of larger diameter to said turntable for rendering inoperative the means for effecting the movement of said sound reproducing means into the starting position for a record of smaller diameter.

65. In combination with a magazine for supporting a plurality of talking machine or phonograph records, a turntable, sound reproducing means, means for moving records from said magazine to said table and from said table to said magazine, means for moving the sound reproducing means from the end of a played record to the beginning of the next record on said turntable, an electric motor for driving said means, a switch for controlling said motor, and means operable by the movement of said sound reproducing means for initiating the operation of said means for moving the records and sound reproducing means, and manually operative means to render said last-named means operative only to open said switch and stop the machine.

66. In combination with a phonograph for playing disk records, a horizontally disposed turntable, means for supporting a vertical stack of records of varying sizes one against the other, and means for shifting said various sized records irrespective of the size thereof from the stack to the turntable and from the turntable to the stack.

67. In combination with a phonograph for playing disk records, a horizontally disposed turntable, means for supporting a vertical stack of records of varying size supported one against the other, means for causing said records to slide from the stack onto the turntable irrespective of the size thereof and means to return the record from the turntable back to the stack.

68. In an automatic phonograph, a turntable, a reservoir adapted to hold records of mixed sizes without regard to the location of the records of various sizes, mechanism for transferring records successively from said reservoir to the turntable irrespective of their sizes, and means for returning each record from the turntable to the reservoir in inverted position to that previously occupied thereby.

69. In an automatic phonograph, in combination, a horizontally disposed turntable, a magazine adapted to hold a plurality of records of various sizes in contacting relation, and record transfer mechanism including means for successively feeding said records irrespective of their size into playing position upon the turntable, said mechanism including means for removing each of said records from the turntable after having been played and returning it to the magazine.

70. In an automatic phonograph, in combination, a horizontally disposed turntable, a reservoir adapted to hold a group of records of various sizes irrespective of their arrangement in the group, said reservoir supporting the records on one side of the turntable supported one against the other, and record transfer mechanism including means for successively feeding said records from one side of the group into operative position upon the turntable irrespective of their size, said mechanism including means for removing the record from the turntable after it has been played and returning it to the other side of the group.

71. In combination with a phonograph for playing disk records, a horizontally disposed turntable always maintained in a horizontal plane, means for supporting a group of records of varying sizes one against the other, and means for shifting said various sized records irrespective of the size thereof from the group to the turntable and from the turntable to the group.

72. In combination with a phonograph for playing disk records, a horizontally disposed turntable always maintained in a horizontal plane, a reservoir for supporting a plurality of records of varying sizes supported one against the other, and means for causing said records to slide from the reservoir to the turntable irrespective of the size thereof and thereafter return the record from the turntable back to the reservoir.

73. In an automatic phonograph, a turntable, a reservoir adapted to hold records of mixed sizes in contacting relation without regard to the location of the records of various sizes, and record transfer mechanism including means for transferring records successively from said reservoir to the turntable irrespective of their sizes, said mechanism including means for returning each record from the turntable to the reservoir in inverted position to that previously occupied thereby.

74. In a phonograph, in combination, a record magazine supporting record tablets in contacting relationship, a turntable, mechanism for transferring records to and from playing position including means for removing a record from the magazine and moving it to the turntable, a reproducer, and reproducer positioning means for placing the reproducer over the preliminary sound grooves of the record irrespective of the size of the record, said record transfer mechanism including means for removing the record from the turntable and turning it over preliminarily to its return to the turntable, and said reproducer positioning means repositioning the reproducer upon the next record to be played in engagement with the preliminary sound grooves irrespective of the size of the record.

75. In a phonograph, in combination, a record magazine supporting record tablets in contacting relationship, a turntable, mechanism for transferring records to and from playing position including means for removing a record from the magazine and moving it to the turntable, a reproducer, and reproducer positioning means for placing the reproducer over the preliminary sound grooves of the record irrespective of the size of the record, said record transfer mechanism including means for removing the record from the turntable and turning it over preliminarily to its return to the turntable.

RUDOLPH F. MALLINA.